(12) United States Patent
Hogl

(10) Patent No.: US 8,150,034 B2
(45) Date of Patent: Apr. 3, 2012

(54) METHOD AND SYSTEM FOR TRANSMITTING DATA FROM A FIRST DATA PROCESSING DEVICE TO A SECOND DATA PROCESSING DEVICE

(76) Inventor: Christian Hogl, München (DE)

( * ) Notice: Subject to any disclaimer, the term of this patent is extended or adjusted under 35 U.S.C. 154(b) by 848 days.

(21) Appl. No.: 12/084,516

(22) PCT Filed: Nov. 3, 2006

(86) PCT No.: PCT/EP2006/068081
§ 371 (c)(1),
(2), (4) Date: May 2, 2008

(87) PCT Pub. No.: WO2007/051842
PCT Pub. Date: May 10, 2007

(65) Prior Publication Data
US 2009/0067627 A1    Mar. 12, 2009

(30) Foreign Application Priority Data
Nov. 4, 2005    (EP) .................................... 05024082
Dec. 23, 2005    (DE) .................... 10 2005 061 999

(51) Int. Cl.
*H04L 29/06*    (2006.01)
(52) U.S. Cl. ....................................... 380/208; 380/243
(58) Field of Classification Search .................. 380/243, 380/205, 208
See application file for complete search history.

(56) References Cited

U.S. PATENT DOCUMENTS

| | | | | |
|---|---|---|---|---|
| 3,910,683 A | * | 10/1975 | Nishino et al. | 359/576 |
| 4,093,346 A | * | 6/1978 | Nishino et al. | 348/292 |
| 5,166,980 A | * | 11/1992 | Burke, Jr. | 380/54 |
| 5,233,436 A | * | 8/1993 | Oksman et al. | 386/252 |
| 5,715,316 A | * | 2/1998 | Steenblik et al. | 380/54 |
| 5,737,420 A | * | 4/1998 | Tomko et al. | 380/285 |
| 5,903,648 A | * | 5/1999 | Javidi | 380/54 |
| 6,002,770 A | * | 12/1999 | Tomko et al. | 380/44 |
| 6,011,874 A | * | 1/2000 | Gluckstad | 382/276 |
| 6,104,812 A | * | 8/2000 | Koltai et al. | 380/51 |
| 6,351,537 B1 | * | 2/2002 | Dovgodko et al. | 380/54 |
| 6,435,502 B2 | * | 8/2002 | Matos | 273/157 R |

(Continued)

FOREIGN PATENT DOCUMENTS

EP    1 229 422 A1    8/2002

(Continued)

OTHER PUBLICATIONS

Bachfeld, "Nepper, Schlepper, Bauernfänger, Risiken beim Online-Banking," ct-Magazin 22/2005, Oct. 17, 2005, pp. 148-153.

(Continued)

*Primary Examiner* — David García Cervetti
(74) *Attorney, Agent, or Firm* — Kusner & Jaffe

(57) ABSTRACT

A method and a system for transmitting data from a first data processing device to a second data processing device, wherein the first data processing device has a display device. The second data processing device generates an encrypted input mask and transmits it to the first data processing device which displays it. The encrypted input mask is decrypted by being viewed through an optical filter having a decryption pattern, and the data to be transmitted are input to the first data processing device using the input mask that has been decrypted by the optical filter and are transmitted to the second data processing device.

6 Claims, 22 Drawing Sheets server-info                transparency pattern                screen pattern                 perceivable pattern

U.S. PATENT DOCUMENTS

| | | | |
|---|---|---|---|
| 6,456,985 B1* | 9/2002 | Ohtsuka | 705/51 |
| 6,493,422 B2* | 12/2002 | Wilkins et al. | 378/98.9 |
| 6,507,413 B1* | 1/2003 | Mueller et al. | 358/1.9 |
| 6,565,089 B1* | 5/2003 | Matos | 273/157 R |
| 6,873,742 B2* | 3/2005 | Schu | 382/274 |
| 6,907,124 B1* | 6/2005 | Gluckstad | 380/205 |
| 6,923,444 B2* | 8/2005 | Matos | 273/153 S |
| 7,130,488 B2* | 10/2006 | Harrington et al. | 382/284 |
| 7,136,522 B2* | 11/2006 | Harrington et al. | 382/166 |
| 7,155,068 B2* | 12/2006 | Zhang et al. | 382/284 |
| 7,193,631 B2* | 3/2007 | Mueller et al. | 345/592 |
| 7,200,096 B2* | 4/2007 | Phua et al. | 369/103 |
| 7,215,792 B2* | 5/2007 | Sharma et al. | 382/100 |
| 7,218,785 B2* | 5/2007 | Sharma et al. | 382/232 |
| 7,230,738 B2* | 6/2007 | Zhang et al. | 358/1.9 |
| 7,269,297 B2* | 9/2007 | Loce et al. | 382/284 |
| 7,376,264 B2* | 5/2008 | Loce et al. | 382/162 |
| 7,379,588 B2* | 5/2008 | Loce et al. | 382/166 |
| 7,697,191 B2* | 4/2010 | Gluckstad | 359/279 |
| 7,791,562 B2* | 9/2010 | Mueller et al. | 345/55 |
| 7,796,753 B2* | 9/2010 | Alasia et al. | 380/51 |
| 2001/0026248 A1* | 10/2001 | Goren et al. | 345/7 |
| 2003/0104859 A1* | 6/2003 | Chaum | 463/22 |
| 2003/0187798 A1* | 10/2003 | McKinley et al. | 705/50 |
| 2004/0068651 A1* | 4/2004 | Pender | 713/168 |
| 2004/0070588 A1* | 4/2004 | Harrington et al. | 345/629 |
| 2004/0071310 A1* | 4/2004 | Sharma et al. | 382/100 |
| 2004/0071339 A1* | 4/2004 | Loce et al. | 382/162 |
| 2004/0071348 A1* | 4/2004 | Harrington et al. | 382/232 |
| 2004/0071349 A1* | 4/2004 | Harrington et al. | 382/232 |
| 2004/0071359 A1* | 4/2004 | Sharma et al. | 382/254 |
| 2004/0071365 A1* | 4/2004 | Zhang et al. | 382/284 |
| 2004/0071366 A1* | 4/2004 | Zhang et al. | 382/284 |
| 2004/0153649 A1* | 8/2004 | Rhoads et al. | 713/176 |
| 2005/0111693 A1* | 5/2005 | Loce et al. | 382/100 |
| 2005/0149761 A1* | 7/2005 | Chiviendacz et al. | 713/202 |
| 2005/0169496 A1* | 8/2005 | Perry | 382/100 |
| 2006/0078113 A1* | 4/2006 | Javidi et al. | 380/210 |
| 2006/0109279 A1* | 5/2006 | Mueller et al. | 345/592 |

FOREIGN PATENT DOCUMENTS

EP     1 472 584 B1     11/2005

OTHER PUBLICATIONS

Naor et al., "Visual Cryptography," published in Eurocrypt 94, pp. 1-13.

International Search Report for International Application No. PCT/EP2006/068081, Jan. 31, 2007.

Naor et al., "Visual Authentication and Identification," Advances in Cryptology-CRYPTO '97, Annual International Cryptology Conference No. 17, Santa Barbara, California, USA, Aug. 1997.

* cited by examiner perceivable pattern screen pattern transparency pattern server-info

| 3 | 1 | 3 | 8 | 4 | 6 | 6 | 5 | 9 | 0 | 7 | 0 |
|---|---|---|---|---|---|---|---|---|---|---|---|
| 0 | 1 | 7 | 2 | 2 | 6 | 5 | 9 | 5 | 3 | 9 | 7 |
| 2 | 9 | 5 | 6 | 9 | 7 | 2 | 9 | 7 | 9 | 6 | 4 |
| 8 | 0 | 2 | 9 | 2 | 9 | 4 | 6 | 4 | 5 | 6 | 3 |
| 7 | 7 | 7 | 6 | 9 | 2 | 7 | 5 | 2 | 1 | 8 | 6 |
| 5 | 7 | 1 | 8 | 5 | 2 | 0 | 7 | 4 | 2 | 0 | 8 |
| 2 | 8 | 9 | 5 | 5 | 8 | 6 | 1 | 8 | 4 | 1 | 9 |
| 1 | 3 | 1 | 5 | 7 | 6 | 6 | 0 | 1 | 2 | 9 | 0 |
| 8 | 6 | 8 | 7 | 5 | 3 | 2 | 0 | 2 | 1 | 7 | 0 |
| 4 | 2 | 6 | 2 | 5 | 8 | 4 | 3 | 8 | 9 | 3 | 2 |
| x | x | x | x | x | x |
|---|---|---|---|---|---|
Fig. 9 a
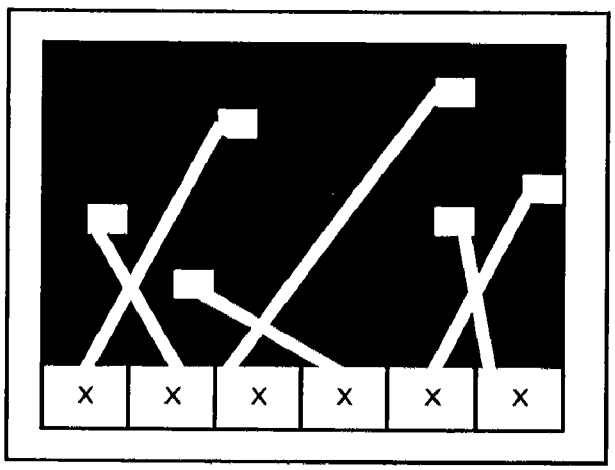
Fig. 9 b
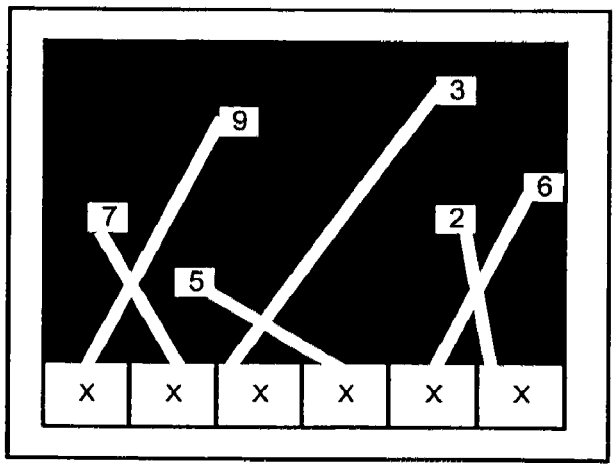
Fig. 9 c

```
5 5 6 3 1 2 0 1 4 5 5 7 0 4 0 3
9 7 5 4 7 1 0 9 7 9 3 6 7 4 7 4
6 0 6 9 0 0 0 2 5 8 0 0 5 3 4 5
4 5 7 5 6 8 4 7 7 6 7 1 7 0 2 9
9 2 2 7 6 7 3 8 7 8 2 3 5 3 2
6 8 6 4 1 4 9 7 3 4 5 0 6 8 3
4 7 4 7 5 1 2 0 9 2 6 3 8 7 1
5 0 3 1 3 7 6 9 2 5 6 1 9 3 6 5
```
1 red
1 green
Fig. 10 a
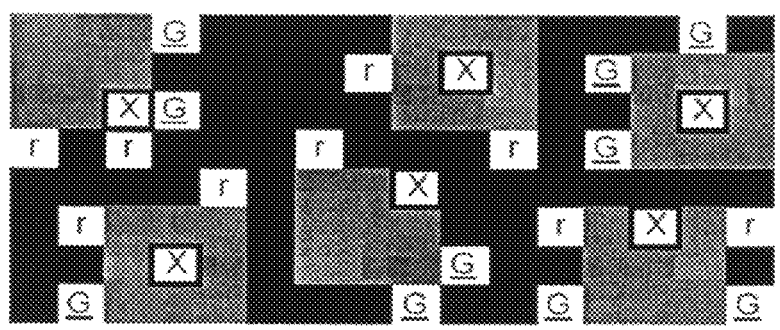
r red
G green
Fig. 10 b
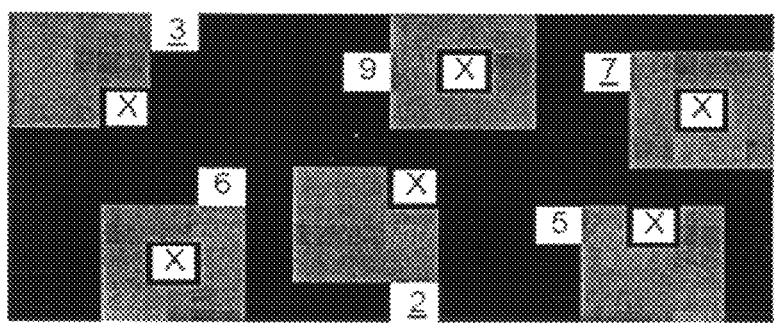
1 red
1 green
Fig. 10 c

| X | X | X |
|---|---|---|
| 5 5 6 0 1 | 2 0 1 4 5 | 5 1 0 4 0 |
| 9 7 5 4 7 | 1 0 2 7 9 | 3 6 7 0 7 |
| 6 0 2 9 0 | 9 0 2 5 8 | 0 0 5 3 4 |
| 4 5 7 5 6 | 8 4 7 7 6 | 7 1 7 0 6 |
| 9 2 2 7 6 | 7 7 3 8 7 | 8 2 3 5 3 |
| 6 8 6 4 1 | 4 9 7 3 4 | 5 6 0 6 8 |
| 4 7 7 7 5 | 1 2 0 9 2 | 6 3 8 3 7 |
| 5 0 3 1 3 | 7 6 9 8 5 | 6 9 9 3 6 |
| X | X | X |
1   red
1   green
Fig. 11 a
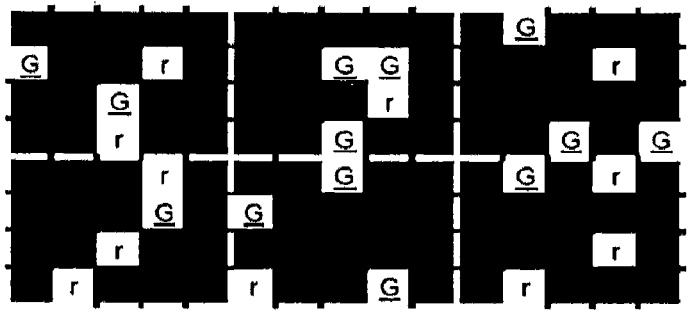
r   red
G   green
Fig. 11 b
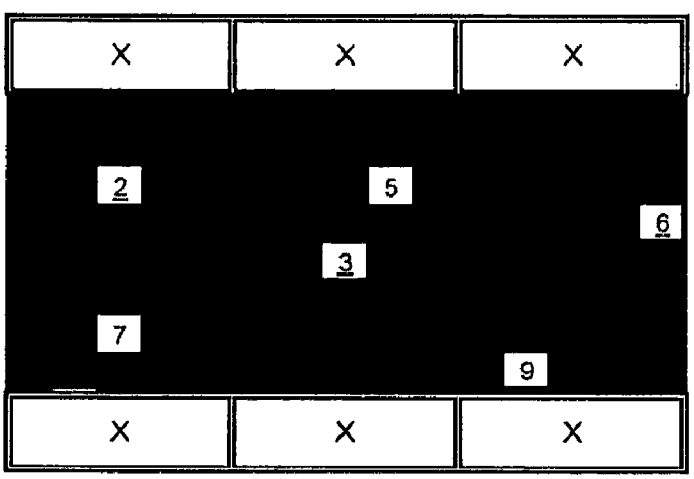
1   red
1   green
Fig. 11 c

METHOD AND SYSTEM FOR TRANSMITTING DATA FROM A FIRST DATA PROCESSING DEVICE TO A SECOND DATA PROCESSING DEVICE

FIELD OF INVENTION

The present invention relates to a method and system for transmitting data from a first data processing device to a second data processing device, where the first data processing device particularly comprises a display device. Furthermore, the invention relates to an online banking method and a method for authenticating a user to a third party, in particular an e-commerce provider.

BACKGROUND OF THE INVENTION

The secure transmission of data is very important in connection with networked data processing devices. Particularly when confidential data are transmitted from one data processing device to another data processing device over a world wide network like the Internet, there is an especially high risk of third parties attempting to gain knowledge of security-relevant or confidential data or attempting to exploit the transmission of these data for their own purposes. For the protection of sensitive data or online commercial transactions with an e-commerce provider on the Internet, often a plain username and personal password input is used. After the user has authenticated himself by entering these data, for example, the online commercial transaction with the e-commerce provider is processed. This process has the disadvantage that third parties can conduct online commercial transactions on behalf of the legitimate user if they have gained access to the user's username and personal password.

The following methods are known by which unauthorized third parties can illegitimately obtain confidential data from users:

A user is directed via a link to a fake website where he enters his username and password (so-called "phishing"). Furthermore, it is known to direct a user, e.g. by manipulating a DNS-(Domain Name System)-server, to a fake website that leads to a fake server even when the correct website address (URL) is manually entered (so-called "Pharming"). Furthermore, it is known to either intercept the data sent from the user to a server and forward them instead of the original data in a modified context or to copy these data and resend them to the server at a later point in time in a modified context (so-called "replay attack").

Furthermore, there are programs that record keyboard strokes and transmit them to unauthorized third parties over the Internet. It is also known to additionally record and unauthorizedly transmit to third parties the actions of screen selection devices like e.g. an electronic mouse or a touchpad in combination with the corresponding screen contents. These methods are known as "keylogging".

Finally it is known to unnoticeably redirect the data traffic between the two data processing devices that exchange the security relevant data via a computer of an unauthorized third party in a way that the data traffic passes through this computer which enables the tapping or manipulation of the data traffic. Here, the intermediary computer can impersonate the server towards the user's data processing device and impersonate the user towards the server and forward either one's data to the other while tapping and/or modifying information. This method is known as "man-in-the-middle-attack".

The above-mentioned methods for unauthorizedly obtaining security relevant or confidential data are often used in combination. In order to better protect the data transmission, there are more secure transmission methods, especially in the field of online banking or corporate network login, that combine the knowledge of a specific personal password with the possession of a specific authentication medium. These methods are known as "Two-Factor-Authentication".

In the simplest case, the user has a list with transaction numbers (TAN). The transaction numbers can be indexed if necessary. Furthermore, there are devices that generate a one-time password which is then entered for the transaction. This method is essentially equivalent to the method in which indexed transaction numbers are used. For each online banking transaction, in addition to his password, the user enters a transaction number that is valid only once. A transaction in which a simple transaction number is used is primarily susceptible to the above-mentioned "phishing" and "pharming-" methods. If an indexed transaction number or a one-time password is used, the method is still susceptible to the "man-in-the-middle attack".

Furthermore, there are methods known in which a passive storage medium, e.g. a CD-ROM, or an active processor medium like a chip card or a USB stick with integrated smart card are used for authentication. The processor medium is coupled with the user's computer, whereupon it communicates with the bank server e.g. by a "challenge/response" method. Though these methods are secure against the above-mentioned methods for the unauthorized obtaining of security relevant data or the unauthorized conducting of or tampering with transactions, the implementation and operation of such systems involve high hardware costs. Even when low-cost storage or processor media are used, and readers or interfaces that are already provided for other purposes in the user's computer, there is the problem that the usability is mostly not guaranteed at arbitrary computers at arbitrary places. Moreover, additional software and hardware, if applicable, must be laboriously installed before these methods can be used.

US 2001/0026248 A1 describes a method by which the screen display of a computer is modified in a way that the screen content can only be read when the screen is viewed through a special optical filter. Thus, the screen content, in particular, cannot be read by a third person who does not possess this special optical filter. The method described in this publication is intended to prevent unauthorized third parties from reading the information displayed on the computer screen. However, it does not disclose a method for securely transmitting data from a first data processing device to a second data processing device. While input into a computer cannot be read by unauthorized third parties, a potential transmission of these data to another data processing device would be unsecured.

SUMMARY OF THE INVENTION

The aim of the present invention is to provide a method and system of the above-mentioned kind for enabling a secure transmission of data between two data processing devices. At the same time, the system shall be implementable in a cost-saving manner and the method shall be operable in a cost-saving manner.

This problem is solved by a method with the features of claim 1. Further advantageous embodiments result from the dependent claims.

According to a first aspect of the method according to the invention the second data processing device generates encrypted input instructions and transmits these to the first data processing device. The first data processing device displays the encrypted input instructions. The encrypted input instructions are decrypted by being viewed through an optical filter having a decryption pattern. The data to be transmitted are input into the first data processing device by using the input instructions that have been decrypted by the optical filter and are transmitted to the second data processing device.

Using the optical filter with the decryption pattern, in the possession of a user, provides a method by which data can be transmitted very securely. Essentially, the same security standards are achieved that are provided by methods using active processor media, e.g. a chip card. The method is thus secure against the above-mentioned "phishing" and "pharming" methods. Moreover, the method provides protection against the above-mentioned "replay attacks" or "keylogging" methods, as the data input makes only sense to a third party if the third party knows the decryption pattern. Finally, the method can be implemented and operated in a very cost-saving manner. An optical filter with a decryption pattern can be manufactured very inexpensively. Moreover, no special readers, as is the case with e.g. chip cards, are required, because the display device of the first data processing device is used as a "reader".

In this context, the term "input instruction" refers to any kind of information that either contains data that a user is supposed to enter or contains instructions as to how a user is supposed to enter data known to him into the first data processing device. For example, a specific code can be displayed in encrypted form that is entered in a conventional manner into the first data processing device upon decryption effected by the optical filter. Furthermore, instructions can be displayed in encrypted form that tell the user how to generate the data to be transmitted. It is further possible that just an input mask is displayed which becomes visible upon decryption by the optical filter and into which the user enters data known to him. For example, the input mask can consist of an array of numeric characters or an alphanumeric keyboard, with the character layout potentially varying for each input mask.

In the context of the invention, the term "optical filter" refers to a device that optically modifies the displayed input instructions, thereby rendering them understandable for the user. The optical filter can be a color filter, polarization filter or pattern which decrypts the input instructions when optically overlaying them. Furthermore, the optical filter can also be a template that singles out specific areas of the displayed input instructions, thus decrypting the input instructions.

According to a preferred embodiment of the method according to the invention, the input instructions are encrypted depending on the filter's decryption pattern. In doing so, the input instructions can be altered at least once per connection session between the two data processing devices. Furthermore, the input instructions can be altered for each data transmission.

According to a preferred further embodiment of the method according to the invention the input instructions are an input mask. The data to be transmitted are entered into the first data processing device via the input mask decrypted by the optical filter. In particular, the data input at the first data processing device is effected by sequentially selecting areas of the displayed input mask. The decrypted input mask, for example, shows a keyboard on the display device. The keyboard positions can then be selected e.g. with an electronic mouse or a touchpad or other screen input devices, thereby entering the data. Furthermore, the decrypted input mask could additionally comprise instructions as to how the data are to be entered into a keyboard. In particular, these measures provide protection against methods of recording keyboard strokes or screen input and transmitting it to unauthorized third parties.

The decryption pattern is e.g. a binary image pattern. When generating the encrypted input instructions, initially a binary image pattern complementary to the decryption pattern can be generated. At those pixels of this complementary image pattern that shall represent the input instructions, the pixel state is then reversed so that their state matches the state of their corresponding pixels in the decryption pattern. Conversely, also a binary bit pattern identical to the decryption pattern could be created initially. At those pixels of this pattern that shall represent the input instructions, the pixel state is then reversed so that their state is complementary to the state of their corresponding pixels in the decryption pattern. Thus, the encrypted input instructions can be generated very easily at the second data processing device. The only requirement is that the decryption pattern of the optical filter of the respective user is known. This decryption pattern or information about this pattern can be stored by the second data processing device when the optical filter with this pattern is sent to a user. Thus, the input instructions are preferably displayed graphically in the form of a pattern.

Generally, the pattern to be displayed, containing the encrypted input instructions, is generated from a given decryption pattern as follows:

An input mask shown e.g. in black and white can be interpreted as a matrix consisting of logical yes-values for black pixels and logical no-values for white pixels. A randomly generated red-green transparency pattern can be interpreted as a matrix consisting of logical yes-values for green pixels and logical no-values for red pixels. During encryption, deriving a red-green display pattern A from the red-green transparency pattern (decryption pattern) F is effected by reversing the color of a transparency pattern pixel from red to green or from green to red in those places where pixels with an equivalent position in the input mask E are black. This operation can be represented as an XOR function between F and E in Boolean algebra. Hence, A=F XOR E or, respectively, A=E XOR F is valid for all corresponding points in the respective matrices (the XOR function is commutative).

During decryption, the overlay of the red-green display pattern with the red-green decryption pattern of the optical filter again effects an XOR operation if a resulting bright (i.e. red or green) pixel is interpreted as a logical no and a resulting dark (i.e. black) pixel is interpreted as a logical yes. Hence, the perceivable result R equals A XOR F. From A=E XOR F and R=A XOR F follows: R=(E XOR F) XOR F. As the XOR-function is also associative, also R=E XOR (F XOR F) is valid. Hence follows R=E. The perceivable result corresponds to the input mask.

According to a preferred further embodiment of the method according to the invention, the decryption pattern comprises areas that are not being used for decryption and use areas embedded therein. In this case, the encrypted input instructions are generated by creating—for those areas that are not being used for decryption—a pattern independent from the decryption pattern, particularly a random pattern. Therefore, the use areas contain the encrypted input instructions, and the areas not used for decryptions contain random patterns.

The XOR operation between the display pattern, i.e. the encrypted input instructions, and the decryption pattern gives rise to the problem that an unauthorized third party can draw inferences regarding the decryption pattern if he gains knowledge of more than two different display patterns. With the further embodiment of the invention, the position, shape and size of the use areas is a secret of the decryption pattern, i.e. this information is not known to unauthorized third parties. The aforementioned is an individual feature of the decryption pattern. With respect to the choice of how to render the display pattern, one is bound to the decryption pattern only in those areas that are being used for the input instructions. Only in these use areas a binary picture pattern complementary to or identical with the decryption pattern must be generated in which single pixels are modified according to the input instructions. Those areas of the decryption pattern that are not being used for decryption can comprise e.g. a black coloring so that they are masked. Thus, the random pattern displayed in these areas of the display pattern is no longer visible after decryption by the decryption pattern. Therefore, this random pattern can be modified with each transaction. If an unauthorized third party gained knowledge of the display patterns of two independent transaction and overlaid them, the non-used areas would again show a random pattern. Within the use areas of the display pattern, the overlaid encrypted input instructions of the transactions would indeed emerge. However, as they are embedded within the random pattern and as the unauthorized third party does not know where the use areas are, which shape they have and how large they are, a decryption is made substantially difficult or impossible.

According to a further preferred embodiment of the method according to the invention, the input instructions are being displayed as a symbol matrix. In this case, the optical filter with the decryption pattern is a template that highlights positions of the symbol matrix of the input instructions and furthermore preferably shows a sequential order of the highlighted symbols. In this case, the input areas are preferably decoupled from the use areas, i.e. the decryption pattern shows where a selection has to be performed on the display in order to select a specific symbol.

According to a modification of this embodiment the symbol matrix is not being displayed in the encrypted input instructions. Rather, the symbol matrix is contained in the decryption pattern, preferably with a binary coding, particularly a binary color coding, being used additionally. In this case, the input instructions merely contain a binary coding, particularly a binary color coding.

According to a further embodiment of the method according to the invention both the input instructions and the decryption pattern comprise, in different areas, a symbol matrix, which preferably is additionally color coded. By collating the symbols in the input instruction area and in the decryption pattern area, the user can authenticate himself. It is particularly preferable about this embodiment that the user can generate the input instructions by himself and transmit them to the second data processing device together with the collation. If the user's decryption pattern is stored at the second data processing device, the second data processing device can authenticate the user by means of the input instructions and the collation. Notably, it is therefore not necessary in this method variant that the second data processing device generates the encrypted input instructions and transmits them to the first data processing device.

According to a preferred embodiment of the method according to the invention, the input instructions comprise a code that, upon decryption effected by the optical filter, is entered into the first data processing device and transmitted to the second data processing device. From the code transmission it can be inferred that the user is in possession of the optical filter with the decryption pattern.

According to a further preferred embodiment of the method according to the invention, in order to align the displayed encrypted input mask to the filter, positions of alignment aids of the filter are selected at the display device and the selection is transmitted to the second data processing device. The input instructions are then generated and/or displayed depending on the selected positions. It is thus possible to individually adjust the input instructions for each data transmission to the display device currently used. This enables a user to perform the data transmission totally independent of location and device. The data processing device used only needs to have a display device.

According to the invention, there is further proposed a method for authenticating a user to an e-commerce provider or to another data processing device. In this method, the user enters a personal code into his data processing device. This code is then transmitted to the e-commerce provider's data processing device. Here, the input and transmission of this personal code of the user is effected by the method according to the invention according to the first aspect as described above.

According to the invention, there is further proposed an online banking method in which a user authenticates to a bank server and then enters the data necessary for an online money transfer procedure, and in which these data are then transmitted to the bank server. In this process, the user's authentication and the input and transmission of at least a part of the data relevant for the online money transfer procedure, e.g. beneficiary, account number and/or amount, is performed by the above-described method according to the invention according to the first aspect. Thus, the user can also protect himself against so-called "man-in-the-middle-attacks" in online banking.

Finally, according to another embodiment, the data relevant for the online money transfer procedure, e.g. beneficiary, account number and/or amount, could be entered in a conventional manner. After that, a confirmation presentation, with an instruction as to how a confirmation is to be entered, is displayed using the above-described method according to the invention, The confirmation is then, upon decryption of the confirmation presentation, entered by the user on the basis of the instruction and finally transmitted to the bank server.

In a conventional online money transfer procedure, an intermediary computer of an unauthorized third party could, e.g. during the login procedure, leave the data unchanged in both directions and immediately forward them. Thus, an unauthorized third party could pass the login procedure and manipulate the subsequent communication, e.g. by modifying the amount and beneficiary data of the online money transfers. In the conventional online money transfer procedure, the unauthorized third party could also pretend to the user that the correct money transfer had been effected. In the online banking method according to the invention, these manipulations are not possible, as all security relevant data can be entered via the encrypted input instructions, so that also an effective protection against "man-in-the-middle-attacks" can be provided.

The system according to the invention, for transmitting data from a first data processing device to a second data processing device according to a first aspect of the invention, is characterized in that an optical filter for the display device of the first data processing device is provided, which filter includes a decryption pattern, that the second data processing device comprises a memory in which the decryption pattern or information about the decryption pattern of the filter are stored, and that the second data processing device comprises a device for generating an encrypted input mask, the encrypted input mask being generable, depending on the stored decryption pattern or the stored information, in a way that the encrypted input instructions, when displayed, can be decrypted by being viewed through the optical filter.

The system according to the invention has the advantage that it can be implemented very cost-effectively, because—besides two conventional data processing devices communicating with each other—only an optical filter with the decryption pattern has to be provided. This can be done very cost-effectively. As mentioned above, the system according to the invention further enables a very secure transmission of sensitive or security relevant data between the two data processing devices.

The decryption pattern can, in particular, contain a binary coding. It is therefore a coded pixel grid. The encryption of the input mask and the decryption pattern can interact in different ways, whereby, when viewing the encrypted input mask, just a random-looking pattern without information content is visible and only the optical filter renders the information content of the input instructions visible. The decryption pattern of the optical filter can e.g. contain pixels or image areas made of optical filters for two complementary colors. For example, the single pixels can consist of areas with filters that are transparent only for read or green light. Such a complementary-color coding can be implemented very easily and cost-effectively. Furthermore, a coding via mutually perpendicular polarization filters is conceivable, provided that polarized light can be emitted with the display device. Furthermore, a plurality of other ways to graphically encode the input instructions is possible.

The optical filter is preferably an at least partially transparent transparency or card. The transparency or card can have e.g. credit-card size. Preferably, it consists of a plastic that is adhesive to the display device. Thus, the filter can be attached to the display device very easily. In order to easily align the filter to the encrypted input mask that is being displayed or is to be displayed, and to the display device, respectively, the optical filter can, in particular, comprise alignment aids.

The decryption pattern is particularly a random pattern individually coded for a user.

The first data processing device preferably comprises an input device through which data can be entered using the decrypted input mask. The input device is preferably a selection device for areas of the display device, such as e.g. an electronic mouse, a touchpad or a touch-screen display.

According to a second aspect of the method according to the invention, for the transmission of data to the second data processing device, means for obtaining a plurality of transaction codes from a plurality of indices are transmitted to a user or to the first data processing device, and the electronic data transmission from the first data processing device to the second data processing device is linked to a specific transaction code from the plurality of transaction codes, the index of this one transaction code having a correlation with the transmitted data.

By the second aspect of the method according to the invention, the data transmission to the second data processing device according to the first aspect of the method according to the invention can be organized in an even more secure way. The present invention, however, also comprises that the method according to the second aspect is executed independently from the method according to the first aspect, i.e. particularly without the display device, the encrypted input instructions and the decryption by the optical filter.

In known data transmission methods, in order to secure the data transmission, there is at best a typically randomly chosen index, serving to select a specific transaction code with which the data to be transmitted are linked. This is, for example, the case in an online banking method having indexed transaction numbers. In the method according to the invention, however, the index has a correlation with the data to be transmitted, i.e. the index is selected or determined, respectively, on the basis of the data to be transmitted. Due to this correlation between the transaction code used in the data transmission, its corresponding index and the data to be transmitted, it is impossible, even in a "man-in-the-middle attack", to unnoticeably modify the data to be transmitted. For such a modification would lead to the result that the specified correlation between the transmitted data and the index of the used transaction code no longer exists. A modification of the transmitted data would, upon verification of the data transmission, either not result in any valid index or result in a different index and hence in a different transaction code, which can easily be detected at the second data processing device.

It is a further advantage of the method according to the invention, according to the second aspect, that it provides, with just a few modifications of the known method having indexed transaction numbers, a far higher level of security than this known method. It can therefore be implemented at low cost and with very low complexity.

The correlation between the data to be transmitted and the index is preferably so simple that it can be easily be established or reproduced by a user.

According to a preferred embodiment of the method according to the invention the transaction code is valid only once. Hence, for every data transmission a different transaction code is used. An unauthorized third party could therefore not use an intercepted transaction code to link it to the data of another data transmission.

According to a further preferred embodiment of the method according to the invention there is a direct mapping between the plurality of transaction codes and the plurality of indices. This mapping from the set of indices to the set of transaction codes is preferably surjective, particularly preferably bijective. Hence, in this case, an index refers to exactly one transaction code.

According to a further preferred embodiment of the method according to the invention, the index of the one transaction code is determined, using an algorithm, from the data to be transmitted. This algorithm can use as parameters all data to be transmitted or a part of the data to be transmitted. Preferably, particularly those data that shall be protected against modification are used for determining the index of the one transaction code. In the simplest case, the index directly matches the data to be protected or a part of these data. In a complicated embodiment, the index results from a functional correlation with the data to be protected and transmitted. If the data protected in this way are modified by an unauthorized third party, the specified functional correlation between the index and these data is no longer satisfied so that the manipulation of these data can be easily detected.

A further advantage of the method according to the invention according to the second aspect is that it is, in principle, not necessary to communicate to the user, before the data transmission, which index the transaction code for the data transmission has. That is to say, in the method according to invention it is sufficient that the index is determined from the correlation with the data to be transmitted.

According to a further preferred embodiment of the method according to the invention the means for obtaining the plurality of transaction codes from the plurality of indices are stored and the first data processing device automatically determines the one transaction code from the data to be transmitted and links the data to be transmitted to this transaction code. In this embodiment, it is advantageously no longer necessary that the user obtains, or respectively selects, and enters the transaction code. In this case, obtaining, or respectively selecting, the transaction code and linking it to the data to be transmitted is performed automatically and invisibly for the user. However, in this case, the means for obtaining the plurality of transaction codes from a plurality of indices should be protected from access by unauthorized third parties.

According to a further preferred embodiment of the method according to the invention, the second data processing device verifies, on the basis of the transaction code used in the data transmission, the integrity of the data transmitted by the user or the first data processing device. In one embodiment, this can be effected by initially verifying whether the transaction code belongs to the set of valid transaction codes and then determining the index assigned to this transaction code. Subsequently, it is verified that this index has the predetermined correlation with the transmitted data. In an alternative embodiment, the verification can also be performed by determining, from the transmitted data, via the predetermined correlation, the index belonging to these data, and, in doing so, verifying that the index determined in this way is a valid index, and subsequently, in a second step, verifying that the transaction code assigned to this index is identical to the transmitted transaction code. As in known methods having transaction numbers, also in the method according to the invention the transaction code is only valid for one data transmission.

The invention further relates to an online banking method for securely transmitting data electronically that uses the above-described method according to the second aspect. Here, the first data processing device corresponds to a data processing device of a user and the second data processing device corresponds to a bank server. The online banking method according to the invention, according to the second aspect, is particularly an improvement of the known online banking methods having indexed transaction numbers. The data transmission can correspond to a message or an order to the bank. In particular, however, is pertains to a money transfer transaction comprising safety-critical and non-safety-critical data. In the method according to the invention, according to the second aspect, the index of the one transaction code being linked to the data transmission has a correlation with security-critical data of the money transfer. For in this case, a manipulation of the security-critical data can be easily detected. The security-critical data particularly comprise the beneficiary's account number. In an especially simple embodiment of the method according to the invention, the index of the one transaction code derives from digits of the beneficiary's account number. For by a manipulation of the beneficiary's account number in a "man-in-the-middle-attack," the money transfer could be diverted to an arbitrary different account in a particularly easy way. In order to avoid that the money transfer can be diverted to an account with the same account number at a different bank, it is further possible to protect the bank code number by incorporating also these data into the correlation between the data to be transmitted and the index of the one transaction code. Also, all beneficiary data, i.e. also the beneficiary's name, if applicable, or a payment reference, could be incorporated into this correlation.

Furthermore, the security-critical data also comprise the amount of the money transfer. If this amount is also incorporated into the correlation between the money transfer data and the index of the transaction code linked to the transaction data, also a manipulation of the amount can be detected easily. The index of the one transaction code could e.g. derive from digits of the beneficiary's account number and from digits of the amount of the money transfer.

According to a preferred embodiment of the online banking method according to the invention, according to the second aspect, the means for obtaining a plurality of transaction code from the plurality of indices are stored and the user's data processing device automatically determines the one transaction code from the security-critical data to be transmitted and links this transaction code to the data to be transmitted. In this way, the online banking method can be simplified and at the same time made more secure compared to conventional methods having transaction numbers.

According to a further preferred embodiment of the online banking method according to the invention, according to the second aspect, the bank server transmits, before the actual data transmission, during an online connection with the user's data processing device, a code to the data processing device, the validity of which is time-restricted to the current online connection. Alternatively, the code could also be valid only for the current order. In this case, the index of the one transaction code can have a correlation with both this code and the transmitted data. This embodiment combines a conventional online banking method having indexed transaction codes with the method according to the invention in which the index has a correlation with the data to be transmitted.

The data processing device according to the invention, for secure electronic transmission of data to a second data processing device according to a second aspect of the invention, is characterized by an input device for entering at least the data to be transmitted, a first data-index-device for determining a specific index from the data to be transmitted, a first index-transaction-code-device for obtaining a transaction code assigned to the specific index from the specific index, a linking device for linking the data to be transmitted to the obtained transaction code that is assigned to the index determined from the data to be transmitted, and an output device for transmitting the data linked to the transaction code.

With this data processing device, the method according to the invention can be performed easily and automatically, especially by the user.

The data processing system according to the invention, according to the second aspect of the invention, comprises the above-described data processing device according to the second aspect as the first data processing device as well as a second data processing device connected to the first data processing device via an electronic network. In this data processing system, the second data processing device comprises: a receiving device for receiving, from the first data processing device, data linked to the transaction code, a second data-index-device—for determining the index from the transmitted data—that corresponds to the first data-index-device of the first data processing device, a second index-transaction-code-device—for obtaining the transaction code assigned to the index from the index—that corresponds to the first index-transaction-code-device of the first data processing device, and a verification device for verifying data linked to the transaction code that have been received from the first data processing device, the verification device enabling to verify whether the transaction code received matches a transaction code that can be determined, with the second index-transaction-code-device, from the index that can be determined, using the second data-index-device, from the received data.

This data processing system can particularly be used as an online banking system for a bank with its users and their data processing devices; here, the online banking method according to the second aspect can be implemented.

In the context of this invention, the term "index" refers to any kind of information from which an associated transaction code can be obtained. The term "obtaining" refers to any kind of mapping, derivation, computation, determining or function call that effects an assignment between an index and a transaction code, the index typically being available as a given information and the transaction code being a sought information known only to the user and respectively the user's data processing device, the index thus acting, in the case of a function call, as input parameter and the transaction code acting as return value.

Thus, the invention comprises e.g. the following variants of embodiments as means for obtaining transaction codes from an index:

In the simplest form, obtaining a transaction code from an index is effected via an indexed TAN list as described above. The means for obtaining the transaction code, in this case, is the indexed TAN list with the information about which transaction code is to be assigned to which index.

In a further embodiment, however, also a non-indexed TAN list could be used and the index could be implicitly contained in the TANs, e.g. as the first two digits of an otherwise six-digit TAN. The means for obtaining the transaction code in this case comprise the specification as to how a transaction code of the TAN list can be determined from a known index.

Furthermore, obtaining a transaction code from an index could also be effected via a table in which each index is composed from a row-column-coordinate and each transaction code from a table item.

The above-mentioned means for obtaining a transaction code, particularly the last-mentioned, could also be used with combined indices. E.g. in the last-mentioned embodiment using a table, the transaction code could be obtained via an index by having multiple row-column-coordinates act as a composite index and the respective assigned (partial) transaction codes as a composite transaction code.

In a further embodiment, obtaining a transaction code could also be effected via a special device into which an index is entered e.g. via a keyboard, with the device determining and displaying an associated transaction code.

A particular advantage of the method, data processing device and data processing system according to the invention is that the implementation can be effected in a very simple and cost-saving manner and that, at the same time, a manipulation of the transmitted data can be detected in a simple, but secure manner.

BRIEF DESCRIPTION OF THE DRAWINGS

The invention is now illustrated with reference to the drawings on the basis of exemplary embodiments.

FIG. 9a shows the encrypted input mask, FIG. 9b shows the decryption pattern and FIG. 9c shows the decrypted input mask according to a first form of a third exemplary embodiment of the method according to the invention, FIG. 10a shows the encrypted input mask, FIG. 10b shows the decryption pattern and FIG. 10c shows the decrypted input mask according to a second form of the third exemplary embodiment of the method according to the invention.

FIG. 11a shows the encrypted input mask, FIG. 11b shows the decryption pattern and FIG. 11c shows the decrypted input mask according to a third form of the third exemplary embodiment of the method according to the invention.

DETAILED DESCRIPTION OF THE INVENTION

Figure 1:
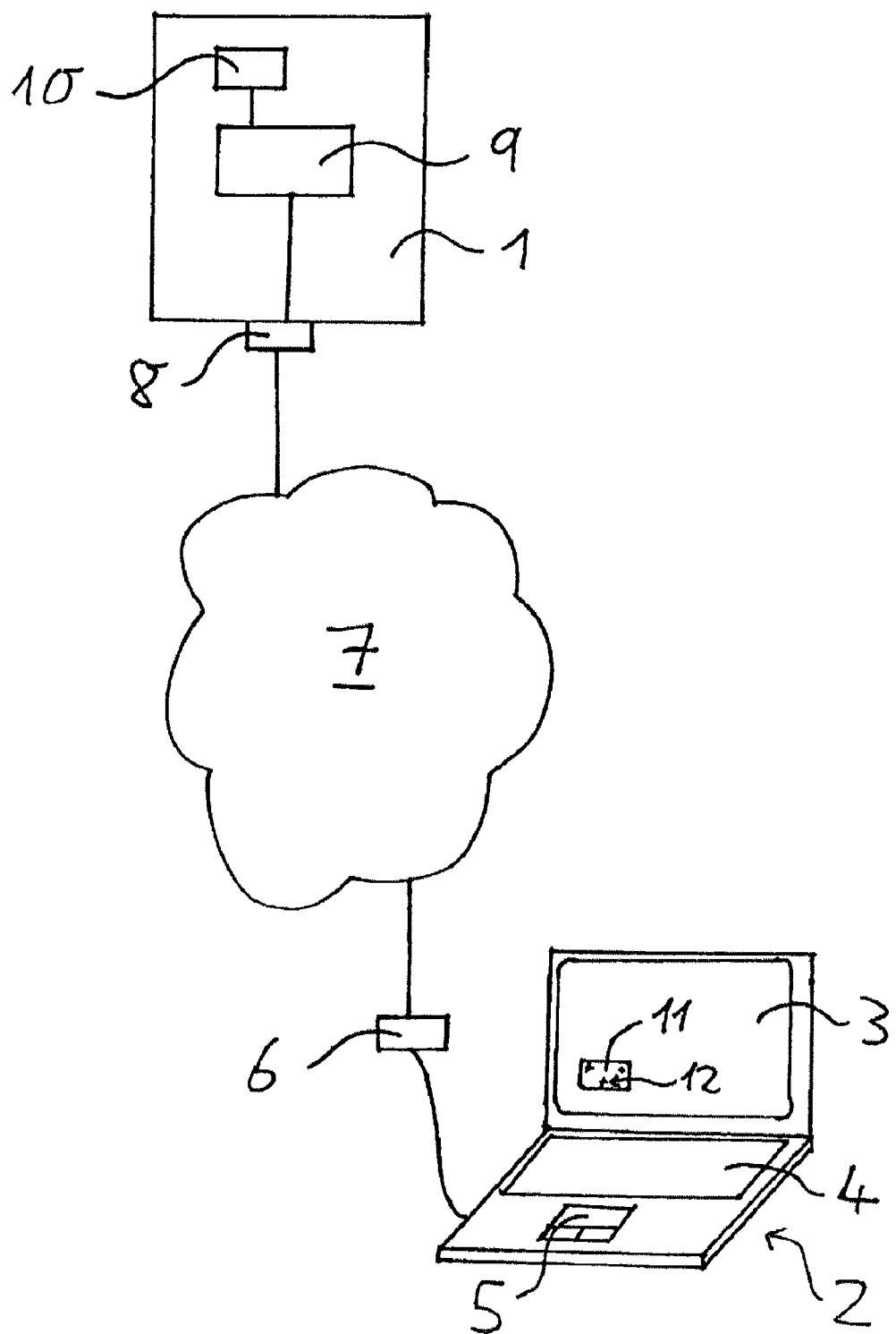
FIG. 1 schematically shows a first exemplary embodiment of the system according to the invention for transmitting data between two data processing devices.

With reference to FIG. 1, the first exemplary embodiment of the system according to the invention is illustrated:

The system comprises two data processing devices between which data can be transmitted. The first data processing device, for example, is a computer 2 of a user and the second data processing device is a server 1 to which confidential or security-relevant data shall be transmitted from the computer 2.

The computer 2 of the user is known in principle. It comprises a display device 3, e.g. a liquid crystal display or another monitor, a keyboard 4 and an input device 5, via which screen areas can be selected. The input device 5 can be a conventional electronic mouse or a so-called touchpad. It is pointed out that instead of the computer 2 an arbitrary other data processing device can be used, provided that it comprises a display device and that data can be transmitted to another data processing device in any manner.

The computer 2 is connected, via a modem 6, to a network like e.g. the Internet 7. Likewise, the server 1 is also connected via a modem 8 to the Internet 7, so that over the Internet 7 data can be transmitted from the computer 2 to the server and vice versa.

Furthermore, an optical filter is provided, in possession of the person who wants to transmit data from the computer 2 to the server 1. It is possible to transmit, using the optical filter, data from computer 2 or from arbitrary other data processing devices to the server 1. The optical filter, in the exemplary embodiment illustrated here, is an at least partially transparent transparency 11. The transparency 11 is made from a plastic material that is adhesive to a display device 3 such as the display of the computer 2.

Onto the transparency 11, a binary random pattern individually coded for each user is applied. This random pattern serves as a decryption pattern for input instructions, in this case particularly for an encrypted input mask that is transmitted from the server 1 to the computer 2 as will later be explained in detail.

The server 1 comprises a memory 10 that comprises a database storing the users of the system and their assigned random patterns, i.e. the decryption patterns. Furthermore, the server 1 has a computing unit 9 capable of generating an encrypted input mask depending on the stored decryption pattern of a user. The encrypted input mask is generated by the computing unit 9 in a way that, upon being displayed, the encrypted input mask is decrypted by being viewed through the optical filter of the associated user, i.e. by the transparency 11 having the decryption pattern of the associated user, so that the user can decrypt the input mask.

Figure 3:
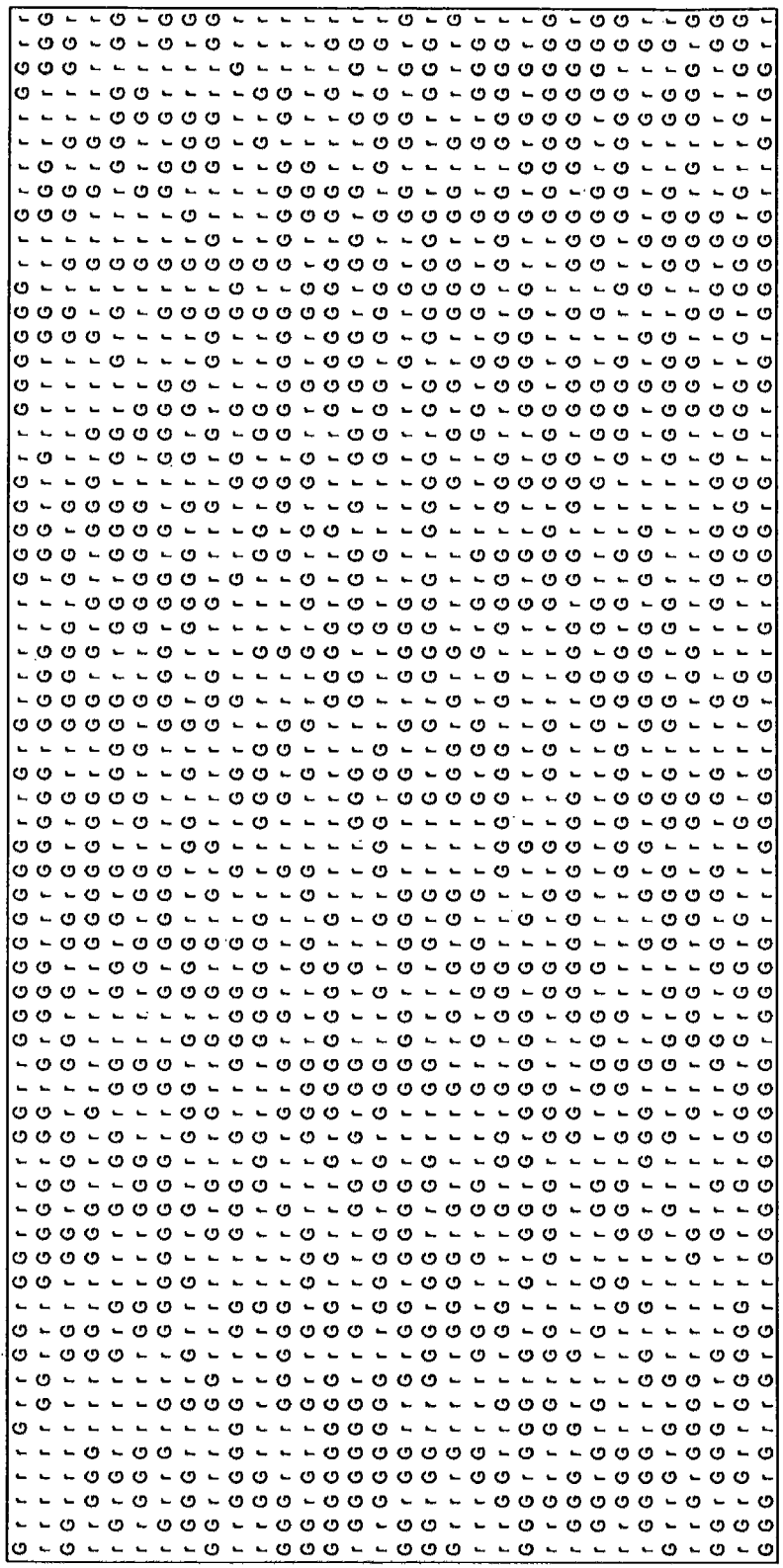
FIG. 3 shows the decryption pattern.

In the following, the first exemplary embodiment of the method according to the invention for transmitting data and further details of the system according to the invention according to the first exemplary embodiment are illustrated:

The entity operating the server 1 generates, upon registration of each user, a transparency 11 with an individually coded random pattern and sends it to the user, e.g. by mail. It would also be possible that, e.g. by e-mail, graphical data are sent to the user that he can print out by himself in order to generate the transparency 11. This random pattern is used to later decrypt an input mask. It is therefore also called decryption pattern. In FIG. 3, such a decryption pattern is shown.

Further, potential users could also be provided with the decryption pattern in the following way: a plurality of decryption patterns is published in a publicly accessible way, e.g. in magazines or on the Internet, each decryption pattern having assigned coordinates. The user could then select a suitable decryption pattern, i.e. by cutting it out, and, before using it, inform the server 1 which coordinates the decryption pattern selected by him has, from which the server 1 can determine the corresponding decryption pattern of the user.

In the first exemplary embodiment illustrated here, the decryption pattern is binary-coded via complementary colors. Hence, the decryption pattern comprises randomly arranged, e.g. red and green filter areas. Due to the black-and-white illustration in the enclosed figures, the red pixels are represented by the symbol "r" and the green pixels are represented by the symbol "G". Black and white pixels further appear in black and white.

A registered user now wants to transmit, using the computer 2, confidential or security relevant data to the server 1. In order to do so, the user establishes a connection with the Internet 7 via the computer 2 and the modem 6 and accesses, by entering a corresponding Internet address, the website of the server 1. Subsequently, he specifies a user name which is transmitted via the Internet 7 to the server 1.

Figure 2:
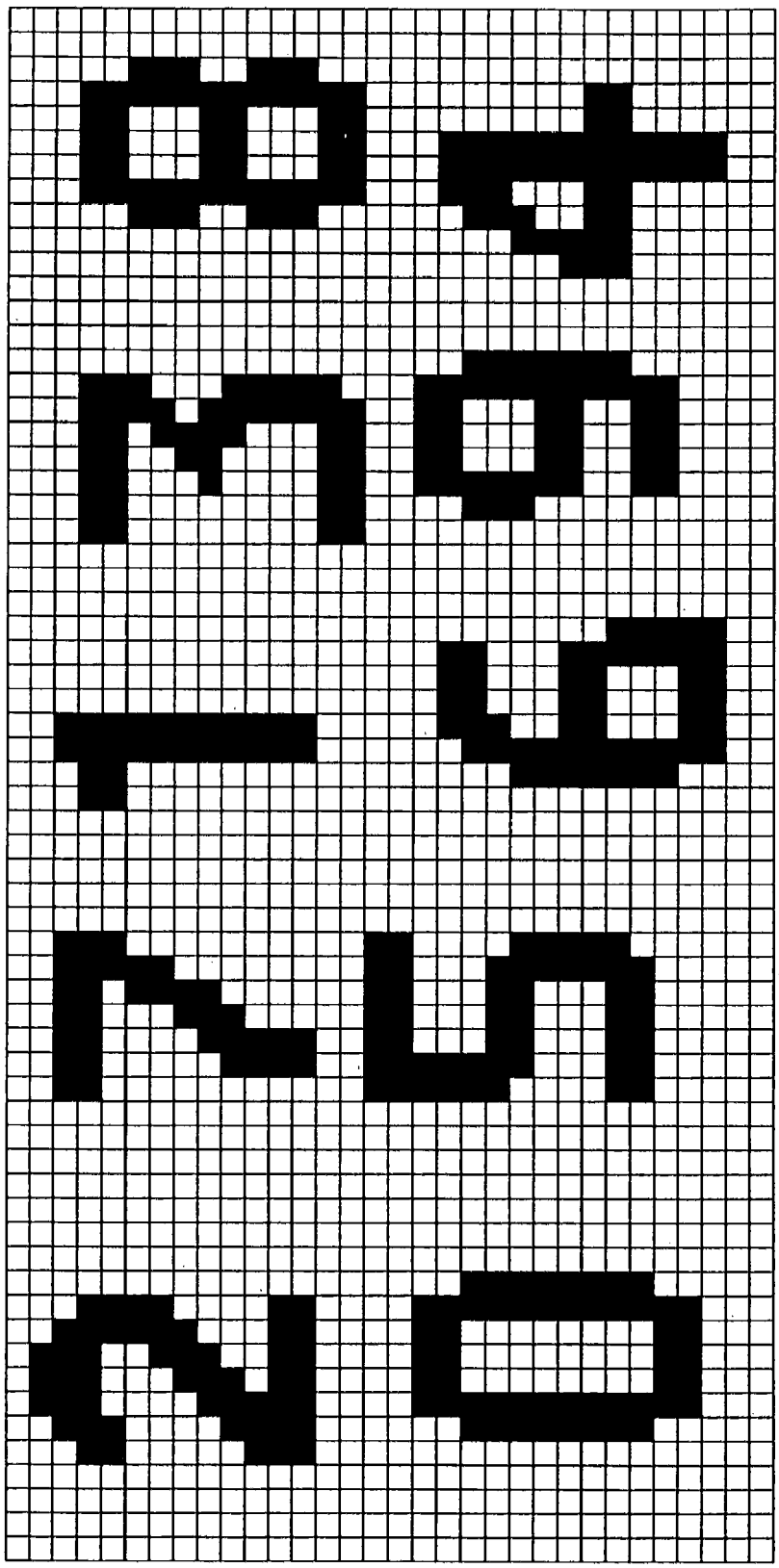
FIG. 2 shows an unencoded input mask.

In the present exemplary embodiment the user wants to transmit a numerical code to the server 1. Therefore, the server 1 initially generates, using the computing unit 9, an input mask in which numerical characters are randomly placed inside a binary pattern. This initial pattern is shown in FIG. 2. It is newly generated for each data transmission. Likewise, the input mask could also contain alphabetic or other characters. Furthermore, a text could be included that contains specific instructions for the input of the data to be transmitted.

The computing unit 9 now determines, by means of the database stored in the memory 10, the user's decryption pattern. The computing unit 9 generates a pattern complementary to the decryption pattern: in each place where the user's decryption pattern comprises a green filter area, a red pixel is generated and in each place where the user's decryption pattern comprises a red filter area, a green pixel is generated. If the display device 3 displayed this intermediate pattern, and if a user viewed this pattern through a decryption pattern of FIG. 3 exactly aligned to the pattern, a black area would emerge because the red pixel emitted by the display device 3 would not be able to pass through the green filter of the decryption pattern and, likewise, the green light emitted by a green pixel would not be able to pass through the red filter of the decryption pattern.

Figure 4:
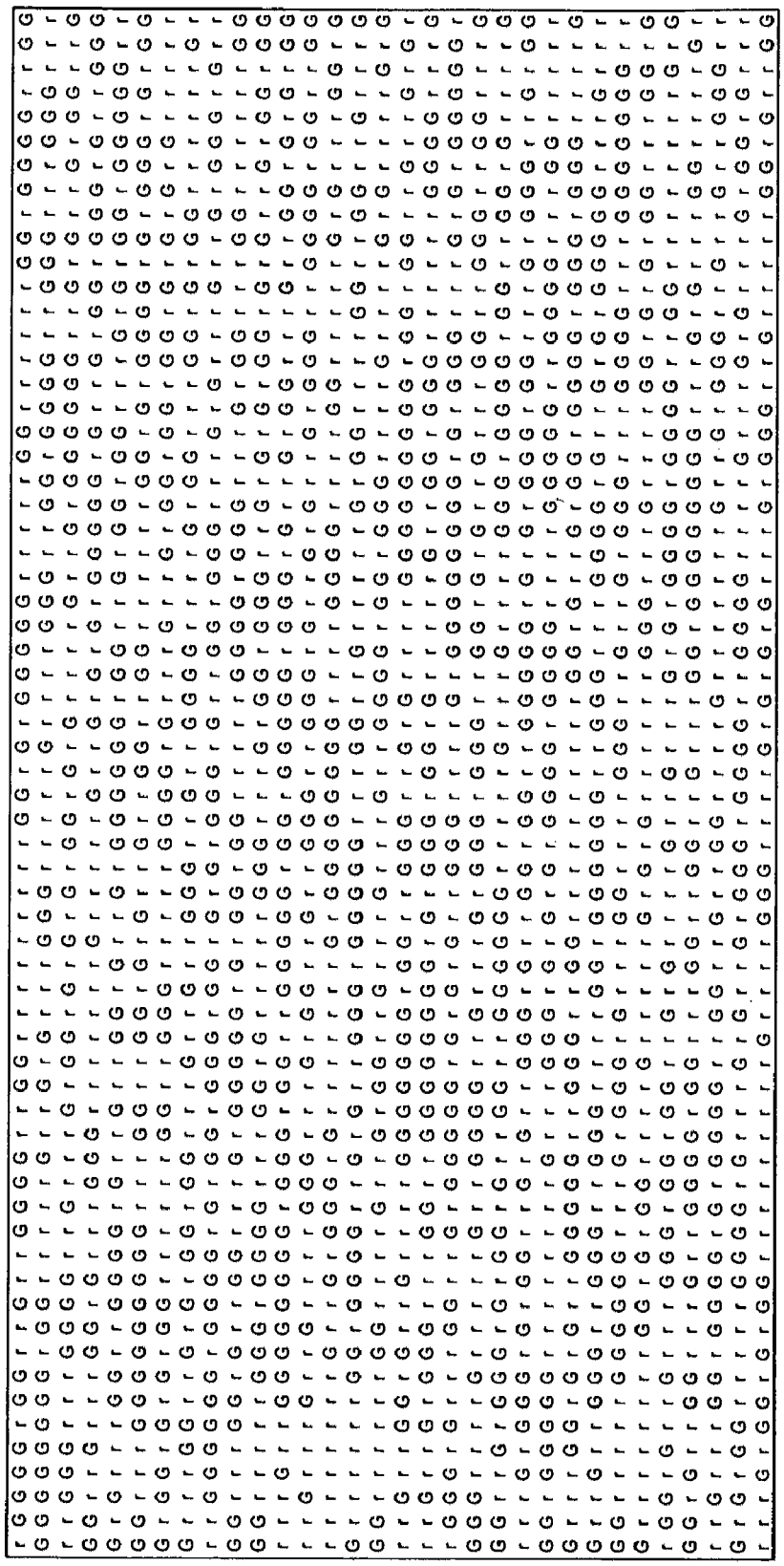
FIG. 4 shows the encrypted input mask.

The computing unit 9 subsequently combines the intermediary pattern with the input mask to be encrypted that is shown in FIG. 2. That is to say, at each pixel of the intermediary pattern, at which, in the input mask as shown in FIG. 2, a pixel contains information for displaying the numerical characters, i.e. the pixel in the example shown is black, the color state of the intermediary pattern is reversed. Hence, at these positions, a red pixel becomes green and a green pixel becomes red. The input mask generated in this way is shown in FIG. 4.

The encrypted input mask is transmitted from the server 1 over the Internet 7 to the computer 2 of the user. In principle, unauthorized third parties could gain knowledge of both the user name of the user 2 and of the encrypted input mask as these pieces of information are each transmitted over the Internet 7. This information, however, would not be of any use for an unauthorized third party, as the decryption of the encrypted input mask requires the decryption pattern of the transparency 11 in possession of the user. The method thus provides two-level security. An unauthorized third party gains no knowledge of the transmitted data, like e.g. the password, as he cannot attach any meaning to the input made via the encrypted input mask. Furthermore, an unauthorized third party cannot enter a password, even when having gained knowledge of the password by other means, as he cannot decrypt the input mask.

Figure 5:
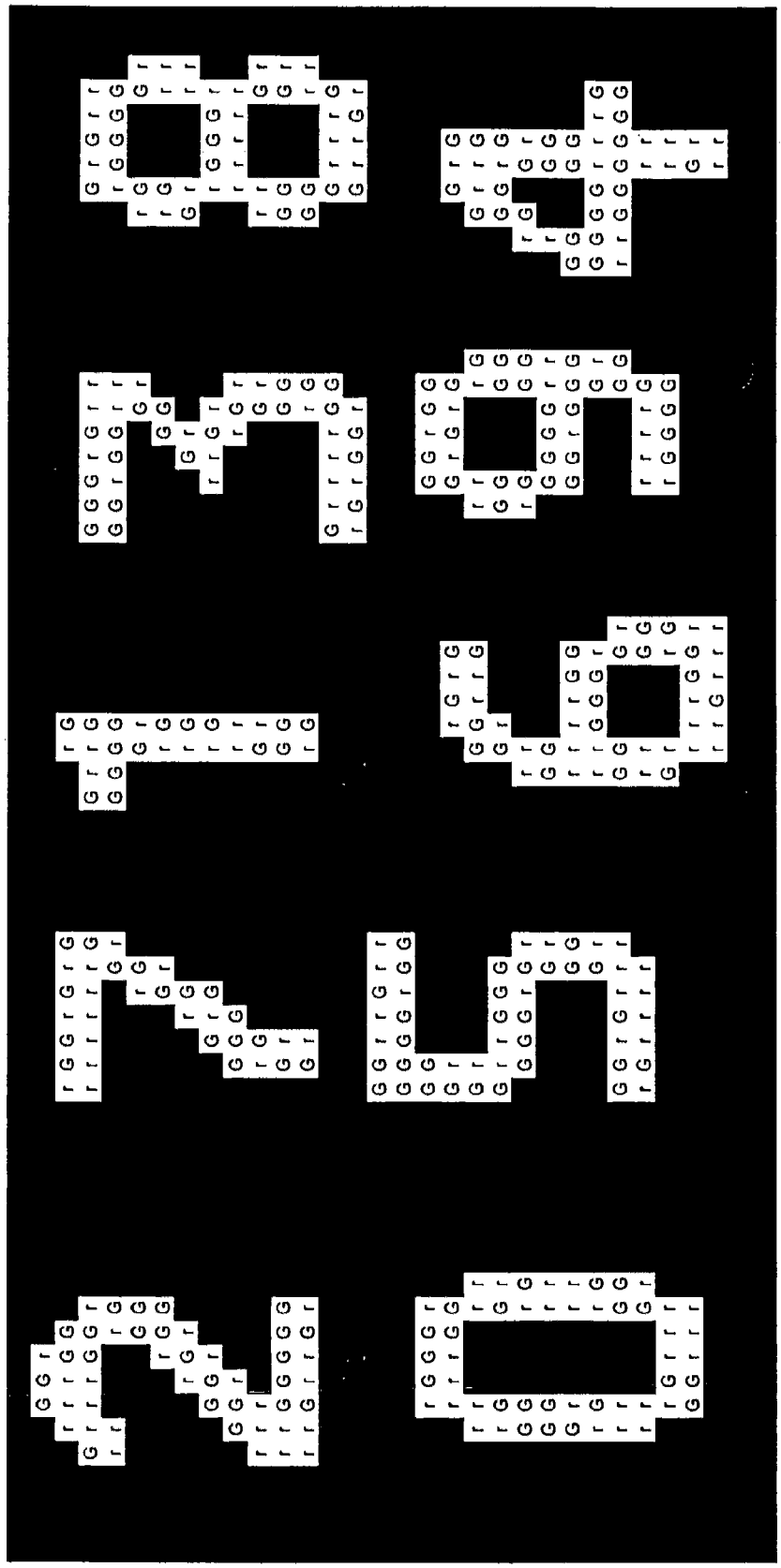
FIG. 5 shows the decrypted input mask, FIGS. 6 and 7 visualize the encryption of a numeric character according to the method according to the invention according to a first exemplary embodiment.

The encrypted input mask is now displayed by the display device 3 of the computer 2. The user can now ascertain that the displayed pattern is indeed a random-looking red-green pattern. In order to decrypt the encrypted input mask, the user now applies the transparency 11 to the display device 3, e.g. by laying it flat onto the display device 3. In order to exactly align the transparency 11 to the displayed encrypted input mask, alignment aids 12 can be placed on the transparency 11 which facilitate the alignment to the displayed input mask. If the user now views the input mask, the image shown in FIG. 5 results. An array of numeric characters consisting of red and green pixels within a black background results. The array of numeric characters corresponds, with respect to the positioning of the numeric characters, to the array of numeric characters shown in FIG. 2. For only at those pixels that represent the array of numeric characters of FIG. 2, red and green pixels and filter areas, respectively, are congruent so that light can pass through the optical filter of the transparency 11. Outside the array of numeric characters, the filter of the transparency 11 is complementary to the displayed encrypted input mask so that no light can pass through the filter of the transparency 11. In these areas, a black surface results.

Furthermore, the decryption pattern and the encrypted input mask could conversely interact in a way that the pixels representing the input mask appear black and the surrounding area is displayed in complementary colors, e.g. red and green.

In order to enter the numerical code to be transmitted, the user can now successively select the areas on the input mask that correspond to the numerical code. For example, he can successively select the corresponding numerals using the touchpad 5 or a mouse. The corresponding selection is then transmitted over the Internet 7 to the server 1. An unauthorized third party who does not know the decryption pattern on the transparency 11 cannot extract any content from the data transmitted in this way because he does not know the input mask. On the other hand, an unauthorized third party is also unable to generate an input mask known to him and transmit it to the computer 2 of the user in order to impersonate the server 1 because for that purpose knowledge of the decryption pattern on the transparency 11 of the respective user is required. Thus arbitrary data, entered via the encrypted input mask transmitted from the server, can be transmitted from the computer 2 of the user to the server 1.

According to a further embodiment of the method the transparency 11 is not aligned to the already displayed input mask but the input mask is generated depending on the used display device 3 and aligned relatively to the decryption pattern of the transparency 11. For this purpose, the user initially places the transparency 11 at an arbitrary position on the display device 3 and then selects, e.g. with the touchpad 5, at least two alignment aids 12, preferably three or four alignment aids 12, on the display device 3. This selection is transmitted over the Internet 7 to the server 1. The computing unit 9 of the server 1 can now adjust the encrypted input mask with respect to its positioning on the display device 3 and with respect to its size so that it is aligned in a precisely fitting way to the decryption pattern of the transparency 11 without the user having to relocate the transparency 11 on the display device 3. This embodiment simplifies the use of the transparency 11 on different display devices 3.

Figure 6:
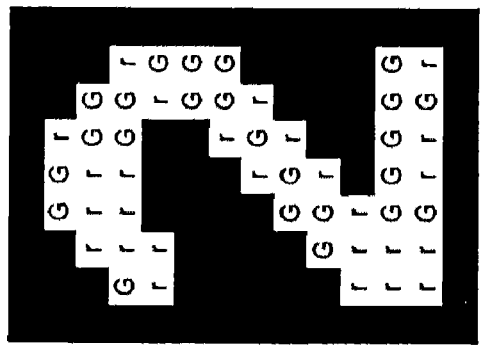
Figure 6:
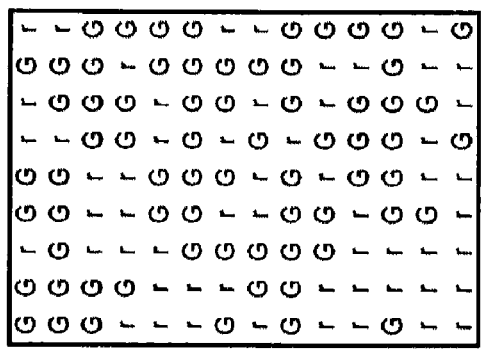
Figure 6:
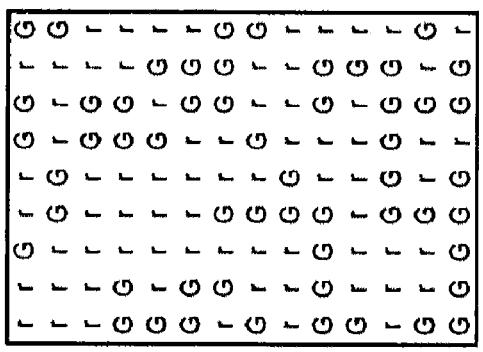
Figure 6:
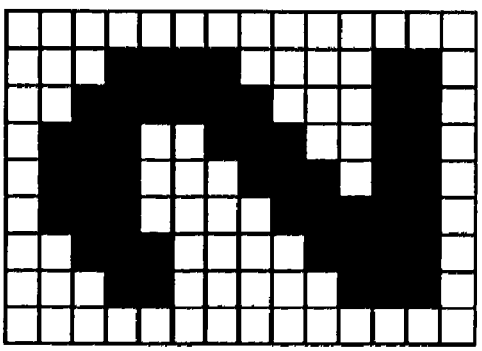

FIG. 6 again shows how e.g. the numeric character 2 is initially encrypted and then perceived by the user. The server 1 initially specifies the numeric character 2 as a binary pattern. After that, the computing unit 9 determines, using the database in the memory 10, the decryption pattern (transparency pattern) of the user. The computing unit 9 then generates a complementary pattern which, however, at those pixels where the numeric character comprises a black pixel, has the same color as the decryption pattern on the transparency 11. The two middle patterns of FIG. 6 show this. In the uppermost row the pixels are complementary to each other. In the second row the first three pixels are complementary to each other, the next three pixels belonging to the representation of the numerical character 2 are identical in the decryption pattern on the transparency 11 and in the pattern shown on the display device 3. The last three pixels of the second row are then again complementary. Depicted on the right side of FIG. 6 is the pattern perceivable when the displayed pattern is viewed through the decryption pattern of the transparency 11. In the second row, initially three black pixels emerge because the decryption pattern of the transparency 11 at these pixels contains a filter that is complementary to the displayed color of the pixels of the encrypted input mask. The next two pixels appear green (symbol "G" in the illustration of FIG. 6) because these pixels are both displayed in green by the encrypted input mask and green filters are provided at the decryption pattern of the transparency 11. For the same reasons, the subsequent pixel appears red (symbol "r") and the last three pixels again appear black.

Figure 7:
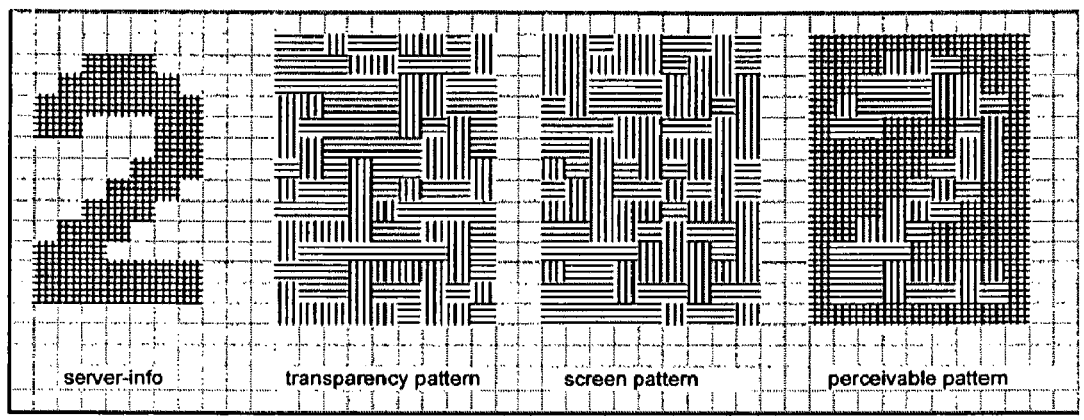

The binary encryption and decryption, respectively, can also be effected in a different way. In FIG. 7 such an example is shown in which the pixels consist of areas with horizontal or vertical lines.

Besides the display device 3 at the data processing device of the user, the only hardware requirement for the system according to the invention and the method according to the invention, respectively, is that the transparency 11 with the decryption pattern is in the possession of the user. The transparency 11, however, can then be used universally with various data processing devices. It is also conceivable to use it with mobile phones comprising a display. The transparency 11 can be manufactured very inexpensively and can easily be sent to a user, e.g. in a letter. Moreover, the user can very easily take along the transparency 11 because it is very small and thin. It can e.g. be as thin as a banknote and have the size of a conventional credit card.

The above-described method can further be used e.g. for authenticating a user to an e-commerce provider. For this purpose, the user initially identifies himself to the e-commerce provider via a name. This name is not confidential in principle. It is harmless if this name is eavesdropped by an unauthorized third party. Using this name, however, the e-commerce provider can determine the decryption pattern of the corresponding user and—as described above—generate a suitably encrypted input mask and transmit it to the user. The user can then decrypt the input mask using his transparency 11 and, as described above, enter his personal code that securely authenticates him to the e-commerce provider.

In the same way, the login procedure into a corporate network can be effected using the method according to the invention. Here, the user can securely authenticate himself by entering a password using the decryption of the encrypted displayed input instructions.

Furthermore, the method can be used in conjunction with an online banking method. In this case, the user can transmit all security relevant data, i.e. particularly his authentication, i.e. his personal code, and data for an online money transfer, using the above-described method. Particularly the data pertaining to the amount of the online money transfer and the data pertaining to the beneficiary of the online money transfer should be entered via the encrypted displayed input mask and thus be transferred in an encrypted way. Such an online banking method is particularly secured against the initially explained "man-in-the-middle attack". To further enhance security, the encrypted input mask could be repeatedly changed during the input of single data. Thus, also a protection against the above-mentioned so-called "replay-attack" can be achieved. The use of so-called transaction numbers would not be necessary in this case. By the way, they do not protect against manipulation by an intermediary computer of an unauthorized third party.

Figure 8:
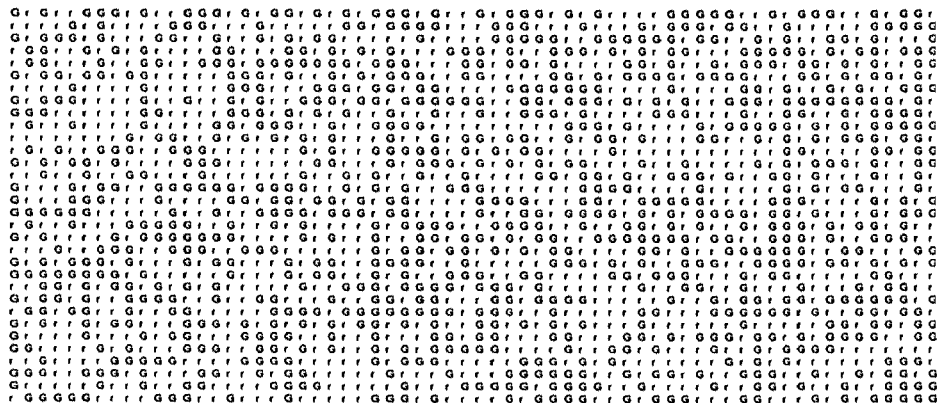
FIG. 8a shows the encrypted input mask.
FIG. 8b shows the decryption pattern and FIG. 8c shows the decrypted input mask according to a second exemplary embodiment of the method according to the invention.
Figure 8:
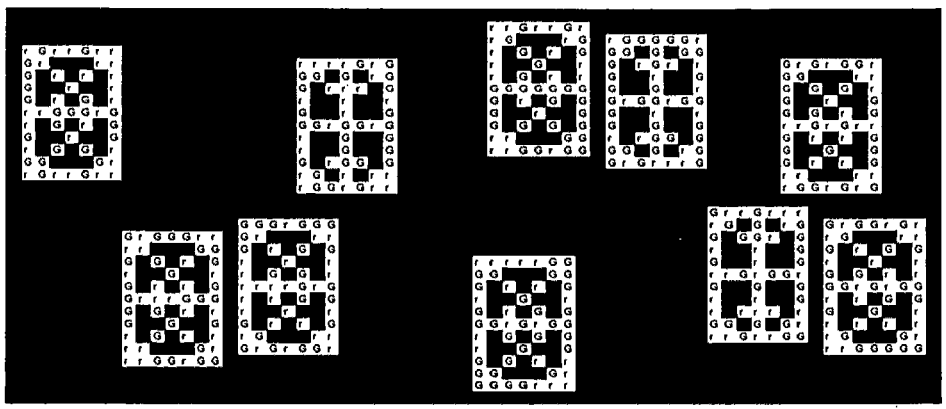
Figure 8:
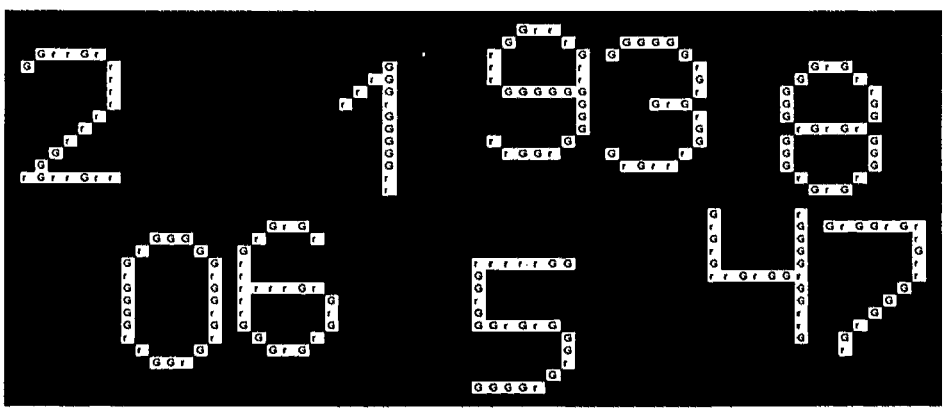

In the following, a second exemplary embodiment of the method according to the invention is described with reference to FIG. 8*a* through FIG. 8*c*.

FIG. 8*a* shows the display pattern, in FIG. 8*b* the decryption pattern of the transparency 11 and in FIG. 8*c* the visible result effected by the optical decryption of the display pattern by the decryption pattern of the transparency 11.

The method of the second exemplary embodiment basically corresponds to the method of the first exemplary embodiment. However, the decryption pattern on the transparency 11 as well as the encrypted input mask generated and displayed by the server 1 differ from the method of the first exemplary embodiment.

The decryption pattern of the transparency 11 comprises areas that are not used for decryption, as well as use areas that are used for decryption and are embedded into the areas not used for decryption. The areas of the transparency 11 that are not used for decryption are designed opaque, i.e. black. Thus, the transparency 11 becomes a template that masks out the areas not used for decryption. In the use areas, the decryption pattern again contains a binary coding, e.g. via complementary colors. At the same time, the use areas are designed in a way that symbols for input instructions can be displayed. In the example shown in FIG. 8, all numeric characters can be displayed. Moreover, the size, shape and position of the single use areas constitutes a secret of the decryption pattern of the transparency 11. Furthermore, as in the first embodiment, the binary coding within the use areas constitutes a secret of the transparency 11.

From the decryption pattern, the server 1 generates, using the computing unit 9, an input mask in the following way: in those areas of the decryption pattern of the transparency 11 that are not used for decryption, i.e. in those places where the transparency is black, a binary-coded, random noise is generated. Into this noise, the input instruction (i.e. the wanted information, represented by numeric characters in the exemplary embodiment in FIG. 8) is displayed in embedded form using steganographic effects. For each input instruction, a random noise is newly generated for those areas that are not used for decryption. For the use areas, the pattern is generated in the way described in the first exemplary embodiment, so that an overlay of the display pattern with the decryption pattern of the transparency 11 of the user would lead to the result shown in FIG. 8c. Visible are numeric characters, embedded into a black background and consisting of complementary colors, e.g. red and green pixels.

In the following, a third exemplary embodiment of the method according to the invention is described with reference to FIG. 9 through 11.

Also the method of the third exemplary embodiment basically corresponds to the method of the first exemplary embodiment. Again, however, the decryption pattern on the transparency 11 and the display pattern generated by the server 1 are generated in a different way.

The input instructions generated by the server 1 do not consist of binary-coded pixels in this case, but of a matrix-like, or respectively table-shaped, representation of a plurality of symbols, e.g. numerals. In this display pattern, the symbols relevant for the input instruction are arranged, in a steganographic manner, at secret positions within random symbols that constitute, as background noise, the steganographic carrier information.

In this case, the decryption pattern of the transparency 11 acts as a template that extracts the symbols for the input instruction from the carrier instruction. As in the first two exemplary embodiments, the use symbols can again comprise a binary color coding.

Furthermore, the decryption pattern of the transparency 11 can contain a mapping, effected by graphic arrangement and highlighting, from the extracted use symbols to screen areas, whereby clicking on these screen areas can effect a selection of the use symbols, without enabling, via the clicking position, any inferences as to the position of the use symbol inside the display pattern or the decryption pattern, respectively. These clickable screen areas are marked with an "X" in the FIG. 9 through 11.

FIG. 9 shows a first form of the third exemplary embodiment, with FIG. 9a showing the display pattern, FIG. 9b showing the decryption pattern of the transparency 11 and FIG. 9c showing the visible result effected by the optical decryption of the display pattern via the decryption pattern of the transparency 11. In the first form of the third exemplary embodiment, shown in FIG. 9, at the screen areas marked with "X", the numerals 9, 7, 3, 5, 6, 2 can be selected.

FIG. 10 shows a second form of the third exemplary embodiment, with FIG. 10a showing the display pattern, FIG. 10b showing the decryption pattern of the transparency 11 and FIG. 10c showing the visible result effected by the optical decryption of the display pattern via the decryption pattern of the transparency 11. In FIG. 10, green areas are represented by underlining the symbols. In red areas, the symbols are not underlined. In the second form of the method according to the third exemplary embodiment, shown in FIG. 10, both the display pattern and the decryption pattern are color-coded. The screen areas marked with "X" are arranged in colored blocks with adjacent use numerals. At the use numerals, the display pattern and the decryption pattern of the transparency 11 have the same color, the numeral being shown in the display pattern. Thus, at the screen areas marked with "X", the numerals 3, 9, 7, 6, 2, 5 can be selected.

FIG. 11 shows a third form of the third exemplary embodiment, with FIG. 11a showing the display pattern, FIG. 11b showing the decryption pattern of the transparency 11 and FIG. 11c showing the visible result effected by the optical decryption of the display pattern via the decryption pattern of the transparency 11. In FIG. 11, green areas are again represented by underlining the symbols. In red areas, the symbols are not underlined. In the third form of the method according to the third exemplary embodiment, blocks are framed by the decryption pattern of the transparency 11, each block having a highlighted use numeral. This use numeral can be selected at the screen area marked with an "X" which is adjacent to the respective block. Thus, the numerals 2, 5, 6, 7, 3, 9 can be selected.

Figure 12:
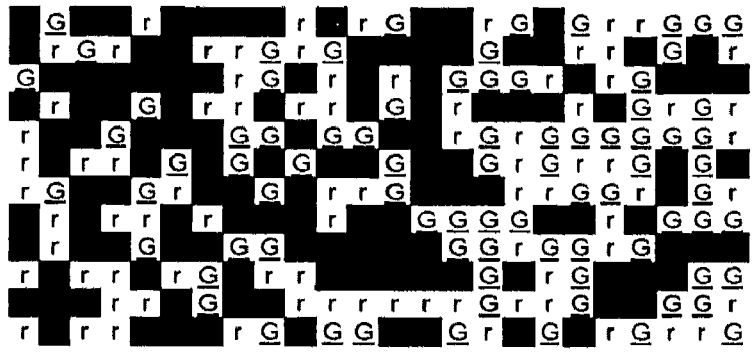
FIG. 12a shows the encrypted input mask.
FIG. 12b shows the decryption pattern and FIG. 12c shows the decrypted input mask according to a fourth exemplary embodiment of the method according to the invention

In the following, the fourth exemplary embodiment of the method according to the invention is illustrated with reference to FIG. 12:

FIG. 12a shows the display pattern, FIG. 12b shows the decryption pattern of the transparency 11 and FIG. 12c shows the visible result effected by the optical decryption of the display pattern via the decryption pattern of the transparency 11. In FIG. 12, green areas are again represented by underlining the symbols. In red areas, the symbols are not underlined.

Compared to the previous exemplary embodiments, the distribution of information between the decryption pattern of the transparency 11 and the display pattern is reversed in this fourth exemplary embodiment. The decryption pattern of the transparency 11 in this case comprises a symbol matrix which can again be binary-coded, particularly color-coded, e.g. in complementary colors. The display pattern generated by the server 1 contains a suitable binary-coded pattern, particularly a complementary-color pattern, by which specific symbols of the decryption pattern of the transparency 11 are faded in or faded out, respectively, in the visible result after the overlay. As can be seen in FIG. 12c, the visible result includes a left block and right block, the left block having multiple numeric characters highlighted in each row and the right block having multiple alphabetic characters highlighted. The input instruction now consists in prompting the user to initially look for the row in which a specific numeric value, e.g. "133", is visibly displayed. This value is visible in the sixth row in the example shown in FIG. 12. After that, the user is supposed to enter those visible alphabetic characters that appear in the right block of the visible result in the same row. In the present example: the character sequence in the sixth row, which is "CUAT".

If the fourth exemplary embodiment is used in conjunction with an online banking method, the numeric value to be looked for in the left part of the decrypted display pattern could consist of a part of the account number. The character sequence resulting from the decrypted display pattern would then be a transaction number to be entered. In this way, the beneficiary's account number could be linked to the transaction number whereby an effective protection against so-called "man-in-the-middle-attacks" could be achieved.

Figure 13:
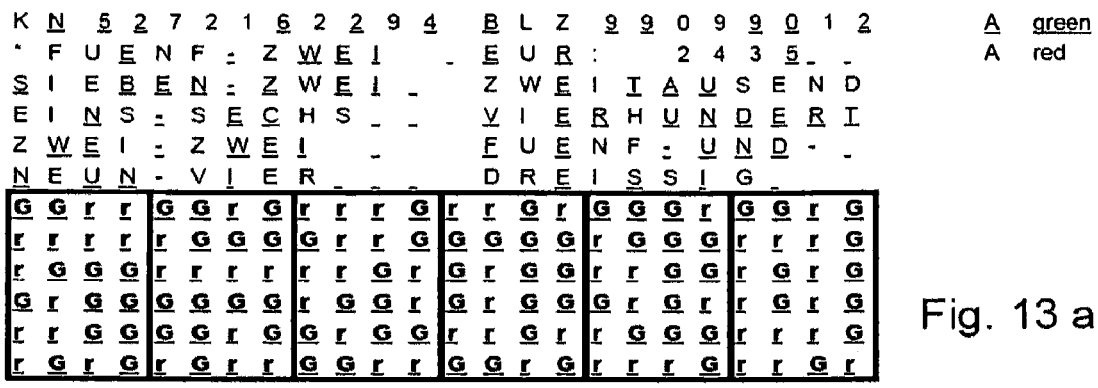
FIG. 13a shows the encrypted input mask.
FIG. 13b shows the decryption pattern and FIG. 13c shows the decrypted input mask according to a fifth exemplary embodiment of the method according to the invention, FIG. 14 through 20 visualize the method according to the invention according to a sixth exemplary embodiment, FIG. 21 schematically shows a second exemplary embodiment of the data processing system according to the invention.
Figure 13:
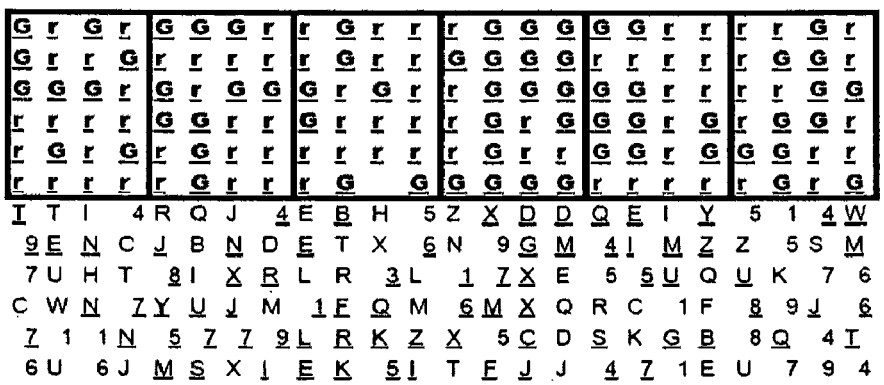
Figure 13:
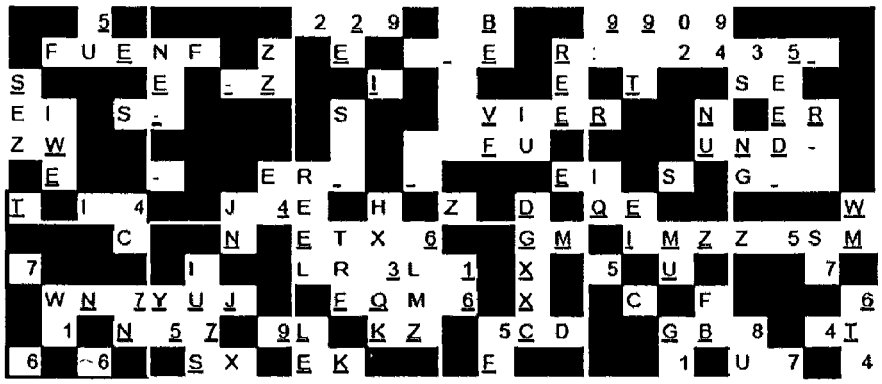

In the following, a fifth exemplary embodiment of the method according to the invention is illustrated with reference to FIG. 13:

FIG. 13a shows the display pattern, FIG. 13b shows the decryption pattern of the transparency 11 and FIG. 13c shows the visible result effected by the optical decryption of the display pattern via the decryption pattern of the transparency

11. In FIG. 13, green areas are again represented by underlining the symbols. In red areas, the symbols are not underlined. Further, in each of FIGS. 13*a* and 13*b*, six blocks are highlighted. These block are also highlighted, e.g. by color, in the visible result shown in FIG. 13*c*.

The fifth exemplary embodiment of the method according to the invention differs from the previous exemplary embodiments in that it is applicable to securely transmitting data in just one direction, e.g. for authenticating, without requiring a previous transmission of encrypted input instructions from the server 1. In fact, the user can generate the display pattern by himself and transmit it to the server 1 together with the data to be transmitted. An advantage of this embodiment is that the display pattern thus does not need to be dynamically generated in an interactive session, adapted to the decryption pattern of the transparency 11, e.g. by a bank server that knows the decryption pattern of the transparency 11; instead, the complementary color coding of the display pattern can be an arbitrary random pattern or can be obtained, e.g. by a hash function, depending on the displayed plain-text information.

The form of the method according to the fifth exemplary embodiment has the advantage that the input instruction and the input based thereon directly depend on significant characterizing features of the transaction to be confirmed by the input procedure. Through this, a kind of simple digital signature is achieved.

Furthermore, it is advantageously possible, compared to the fourth exemplary embodiment, to not only specify part of e.g. an account number of a bank transaction, but, if necessary, the complete account number, bank code number and amount.

In this case, the decryption pattern of the transparency 11 contains a plurality of blocks. One part of the blocks contains just a binary color coding, the other part of the blocks additionally contains symbols arranged in a random pattern, e.g. consisting of numeric and alphabetic characters. The display pattern also contains a binary color coding, however it contains the symbols in those blocks where the decryption pattern does not contain symbols. The user now selects, in the visible result, for each two blocks placed above one another, one symbol that occurs both in the upper and lower block and which is color-highlighted in both blocks. Thus a six-digit code can be obtained. In the example shown in FIG. 13*c*, this is the character "I" for the first blocks placed above each other, the character "N" for the second blocks, the characters "E" for the third blocks, the character "F" for the fourth blocks, character "U" for the fifth blocks and the numerical character "5" for the sixth blocks. This code is transmitted, together with the display pattern, to the server 1 which can thus authenticate the user and interpret the transmitted code as a transaction confirmation.

Figure 14:
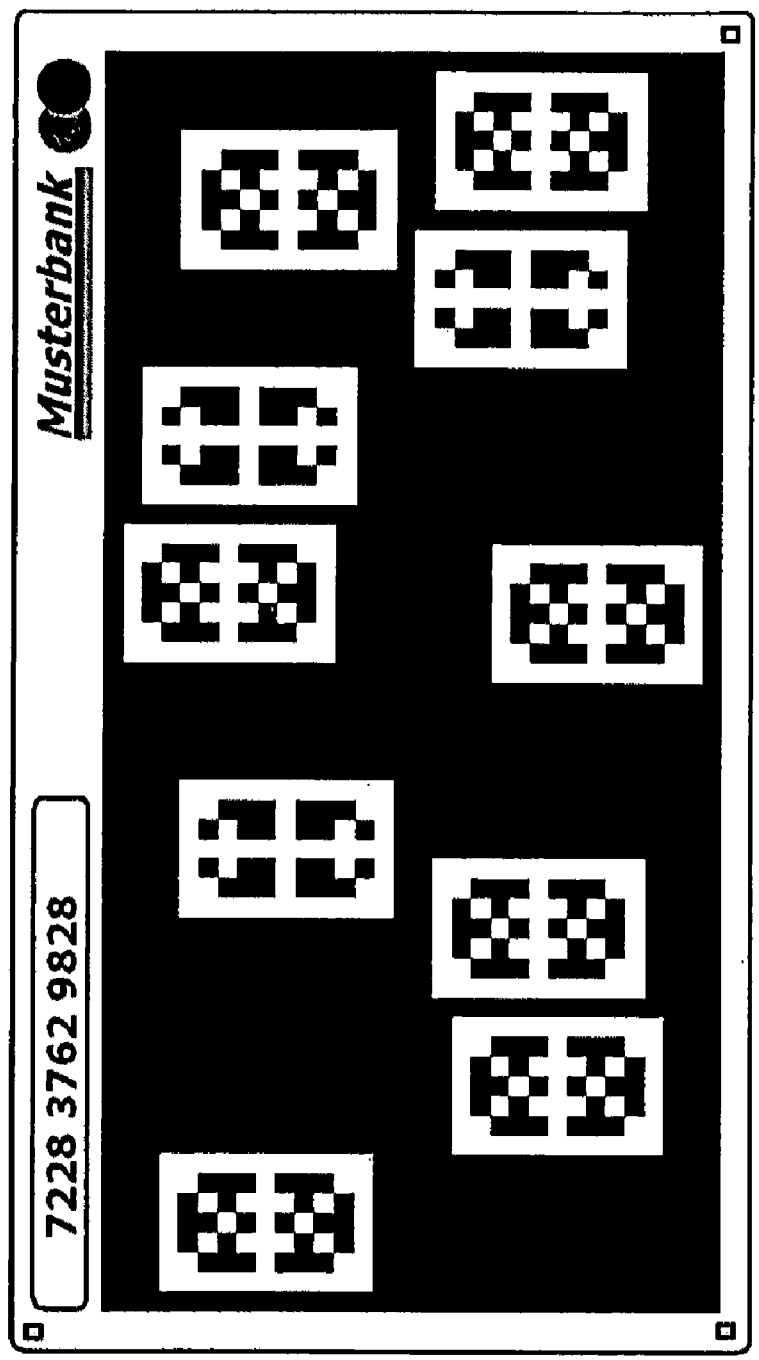

In the following, a sixth exemplary embodiment of the method according to the invention is illustrated with reference to FIG. 14 through 20:

The sixth exemplary embodiment relates to an online banking method. The user is in possession of a transparency 11 with the decryption pattern. As in the first embodiment, this decryption pattern is stored in the memory 10 of the server 1 of a bank. FIG. 14 shows the transparency 11 that contains a serial number in the upper left part and further a decryption pattern which comprises opaque black areas that are not user for decryption, and randomly arranged use areas with a unique red-green random pattern. In the exemplary embodiment shown in FIG. 14, a total of ten use areas for displaying numerical characters are provided. Furthermore, the transparency comprises alignment aids 11 in three corners.

Figure 15:
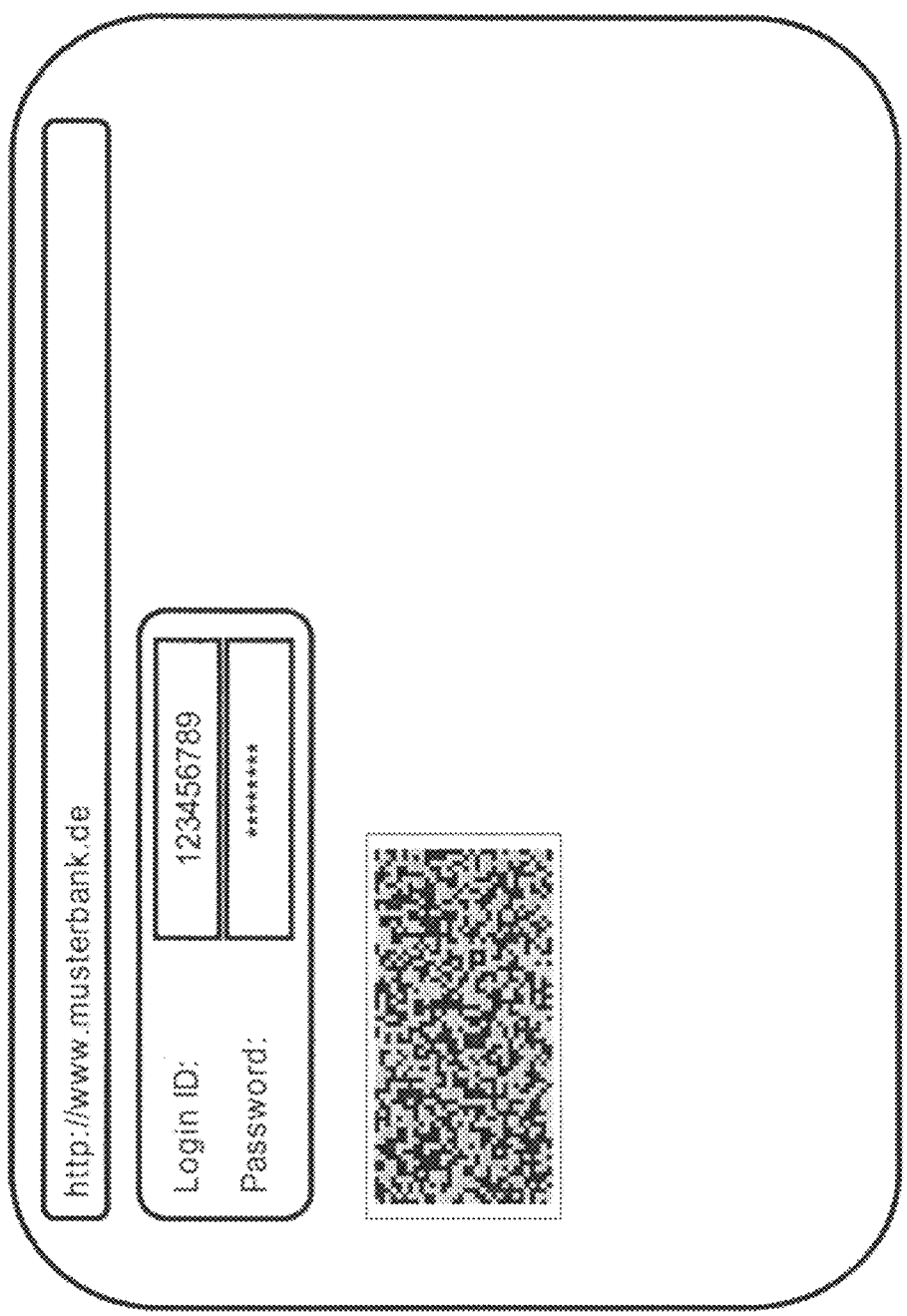

For an online banking session, an input field for an identification code and a password is displayed on the user's screen, as shown in FIG. 15. Further, an encrypted control field with a display pattern is displayed by the bank server, the size of which corresponds to the size of the decryption pattern of the transparency 11 and which has been generated as described above.

Figure 16:
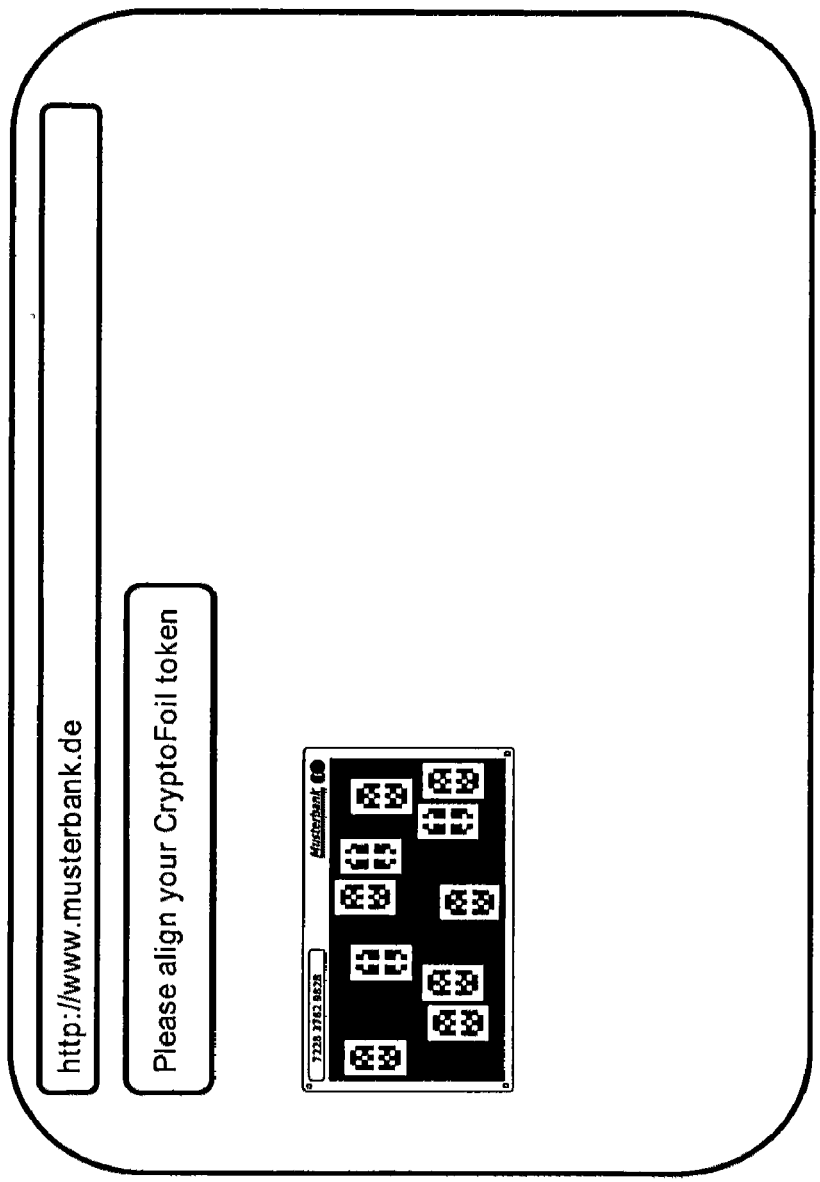
Figure 17:
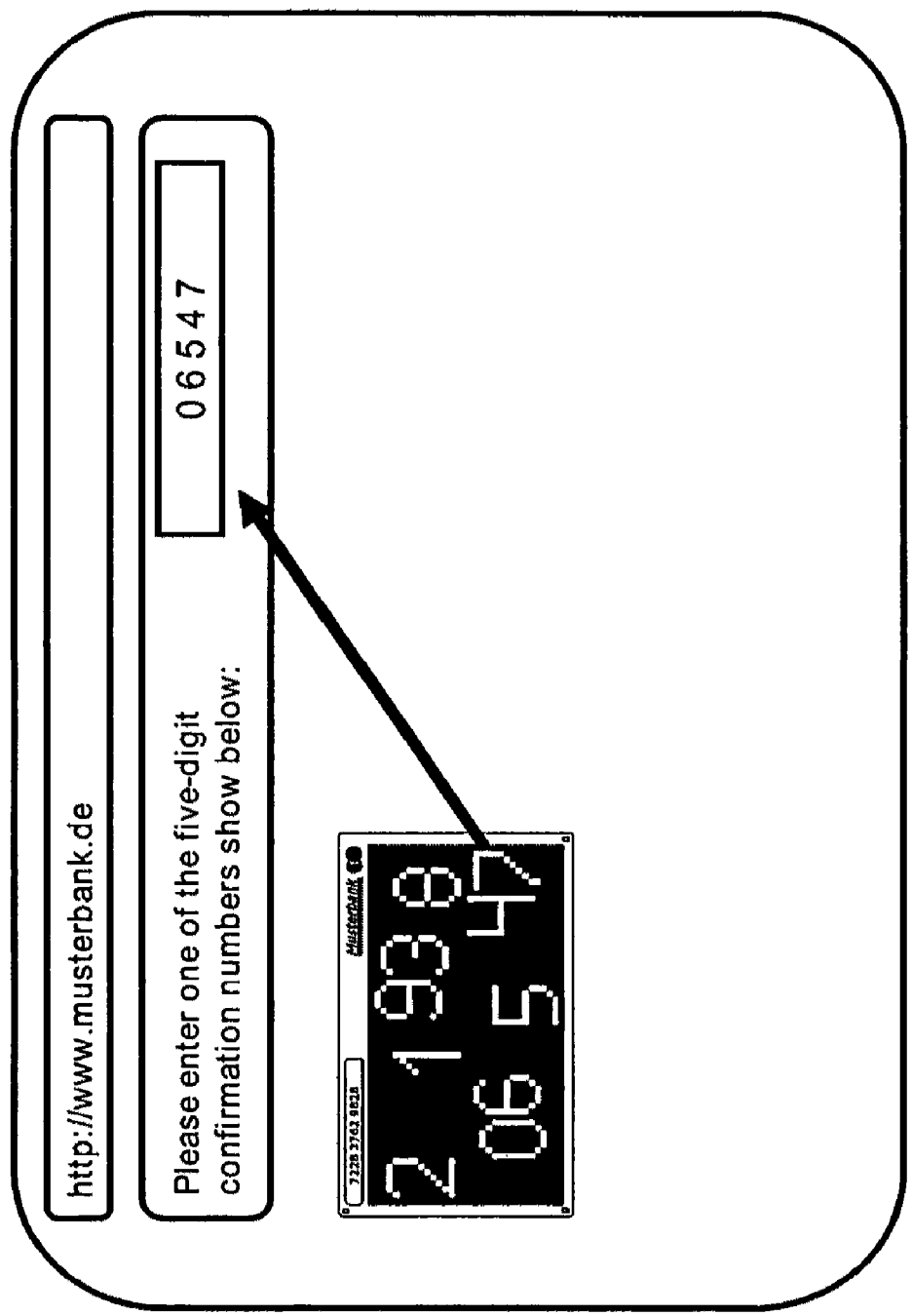

After the user has entered his identification code and his password, there is displayed, as shown in FIG. 16, a request to attach, e.g. adhesively, the transparency 11 with the decryption pattern onto the screen at the control window, and to click on the alignment aids 12. Thereupon, the server adjusts the size and position of the display pattern in order to exactly align it to the decryption pattern. The decryption pattern of the transparency 11 now decrypts the display pattern displayed by the server 1 by making visible the ten numeric characters 0 through 9 in the use areas of the transparency 11. In order to finalize and confirm the login procedure, the user now enters either the upper or lower five-digit confirmation number, i.e. the numeric sequence "0, 6, 5, 4, 7".

Figure 18:
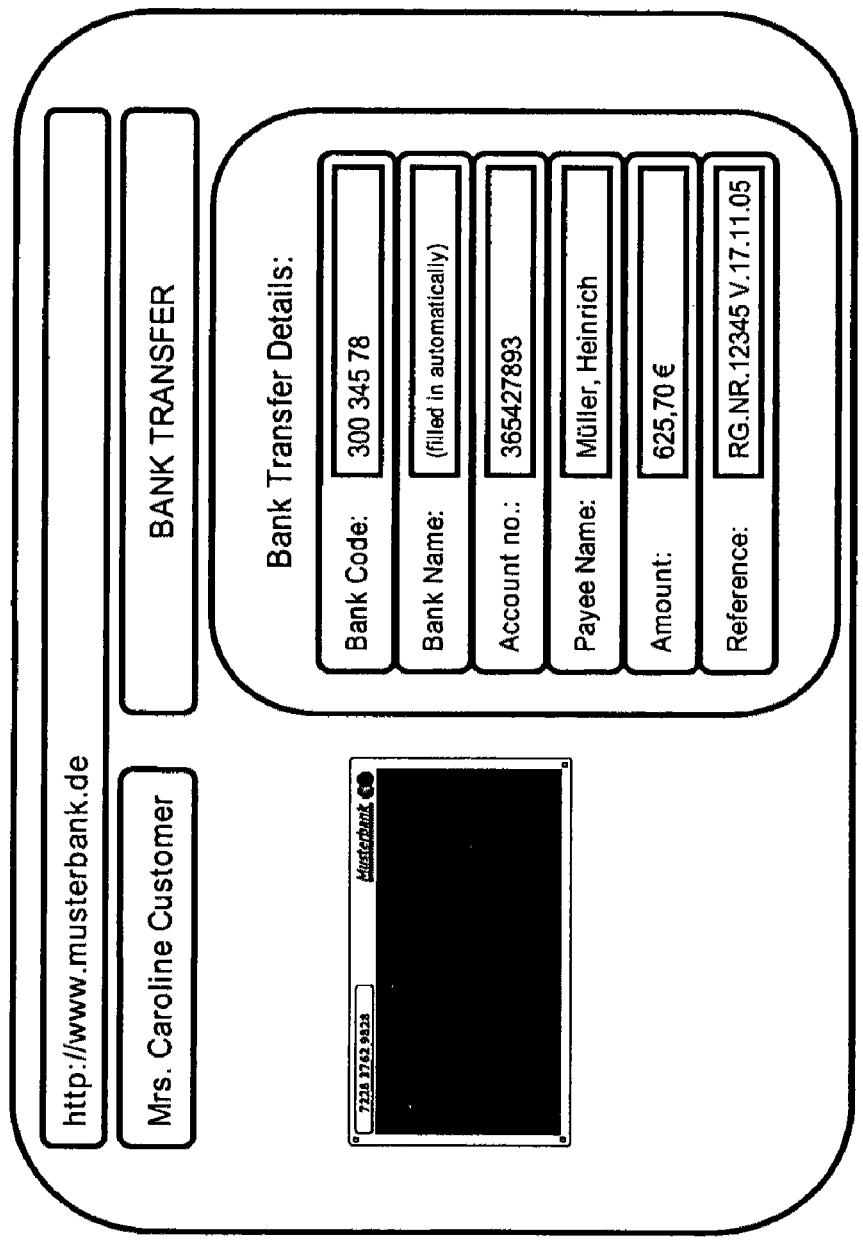

As shown in FIG. 18, the user now starts the bank transaction, e.g. an online money transfer transaction, by entering, in unencrypted form, the details into the corresponding fields.

Figure 19:
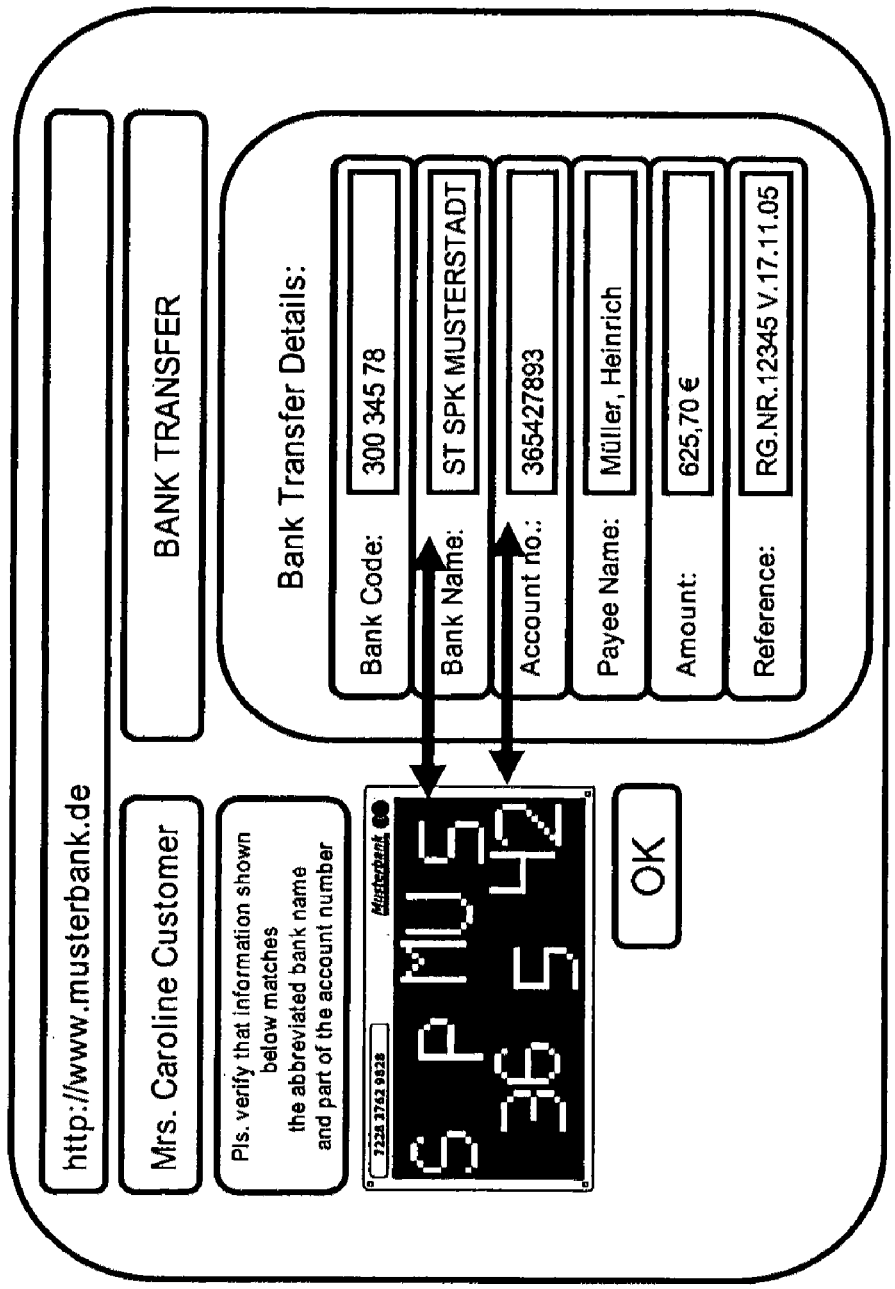

Subsequently, the bank server 1 generates a display pattern which, upon decryption by the decryption pattern of the transparency 11, exhibits, in the upper row, an abbreviation of the name of the bank of the transaction, and, in the second row, a part of the beneficiary's account number. As shown in FIG. 19, the name of the beneficiary's bank is abbreviated with "SPMUS". In the second row, the first five digits of the beneficiary's account number are shown. The user is prompted, by clicking on the "OK" area, to confirm that the abbreviation of the name of the beneficiary's bank actually matches the transaction's beneficiary bank and that the first five digits of the beneficiary's account number match the decrypted display in the second row of the display pattern.

Figure 20:
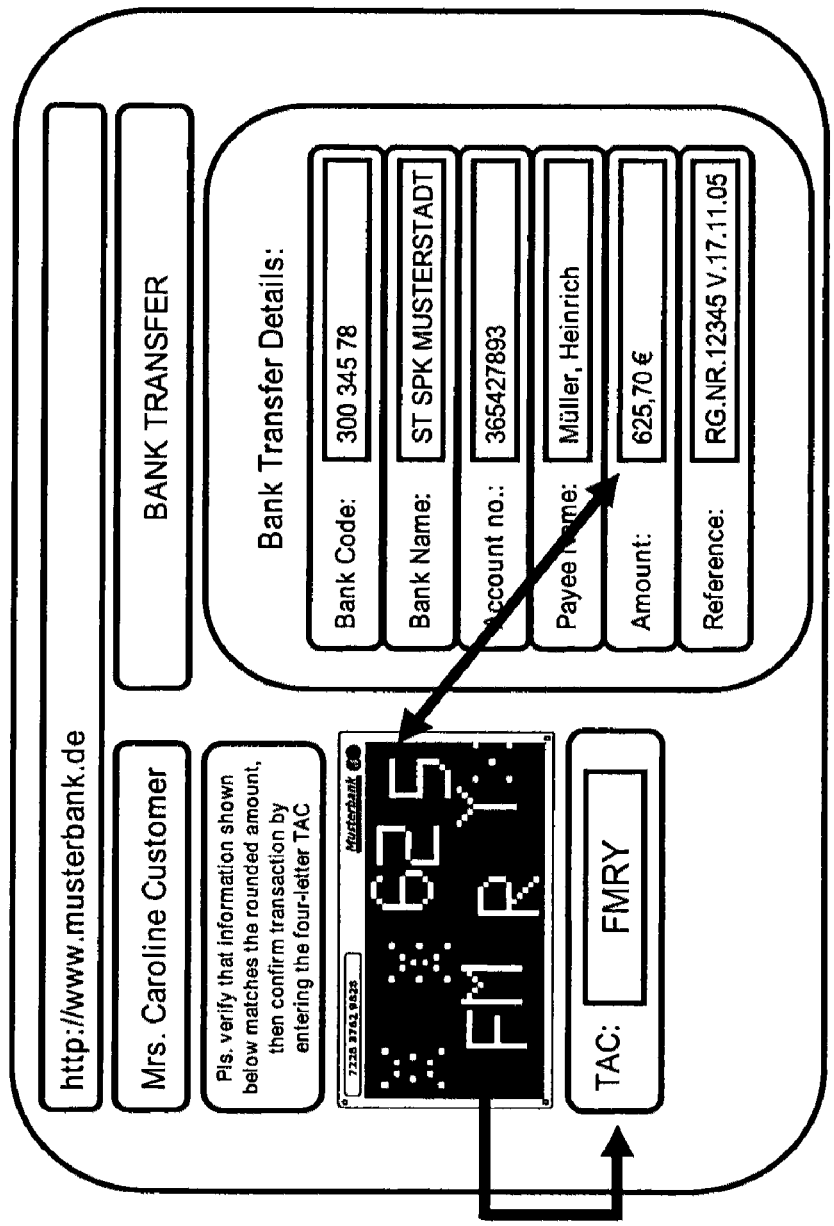

Subsequently, the bank server generates a new display pattern, the decryption of which is shown in FIG. 20. It contains, in the first row, the amount of the money transfer (without fractional digits), and a disturbing pattern to which no numeric characters can be assigned. The user is prompted to verify whether the amount shown in the first row of the decrypted display pattern matches the transaction's amount and, if this is the case, to enter the transaction code shown in the second row of the decrypted display pattern. In the exemplary embodiment shown in FIG. 20, this is the code "FMRY". This transaction code is transmitted to the bank server. From the data transmitted, the bank server can, firstly, infer that no modifications of the name of the beneficiary's bank, the beneficiary's account number or the transaction amount have been made. Further, the bank server can infer that the transaction code has been entered by the owner of a specific transparency 11 with a unique decryption pattern.

Figure 21:
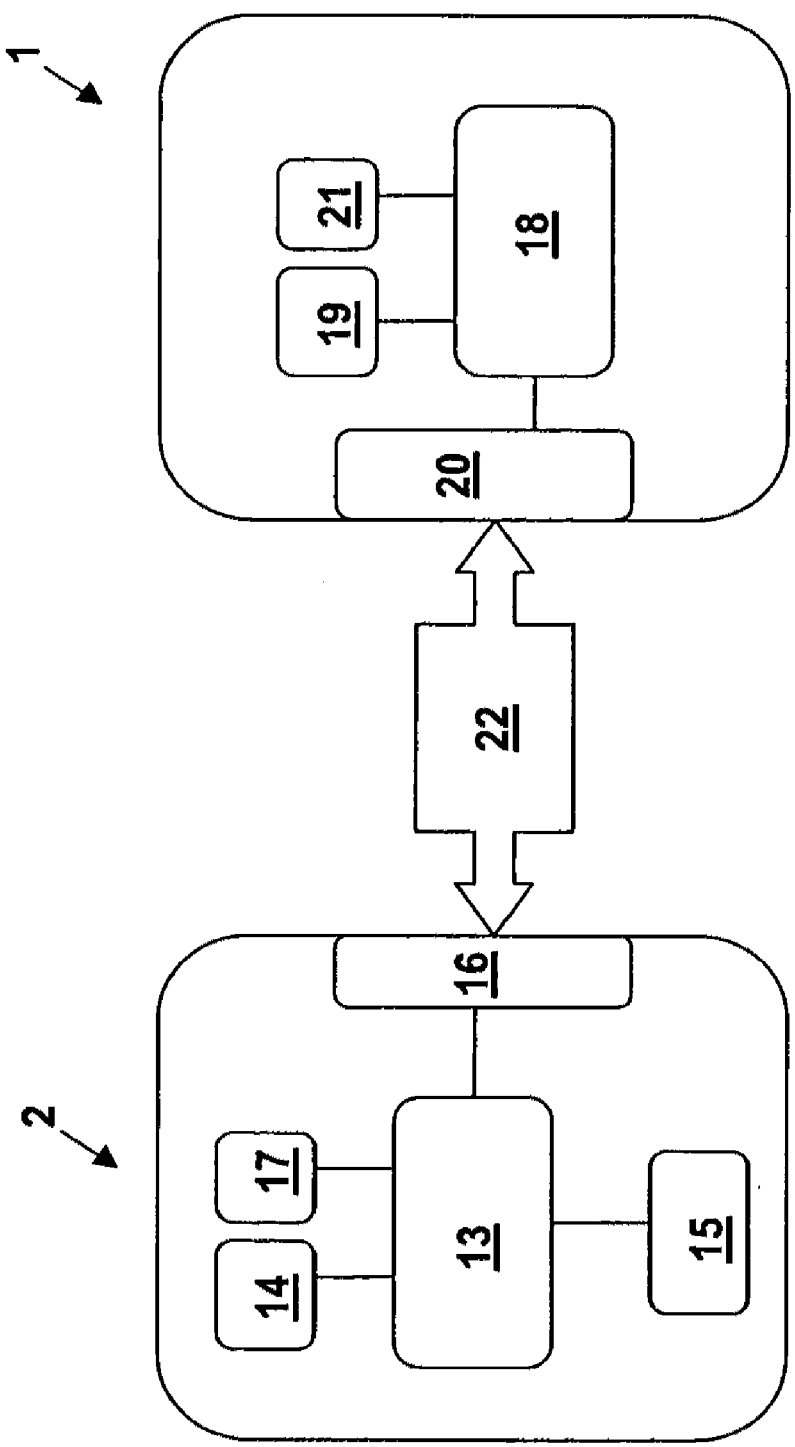
Figures 22, 23:
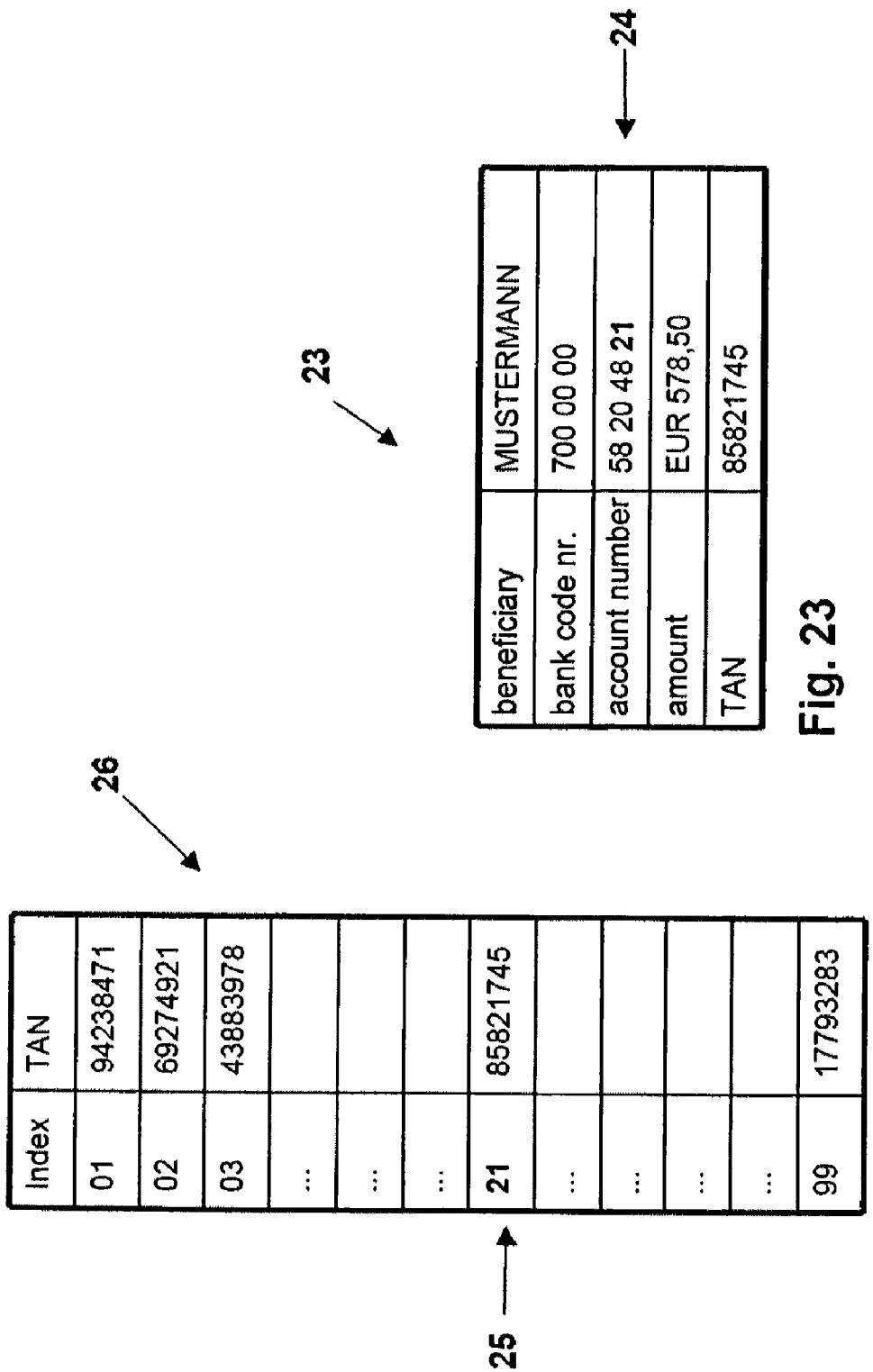
FIG. 22 shows the transaction codes with the assigned indices according to a seventh exemplary embodiment of a method according to the invention.
FIG. 23 shows an example for the data to be transmitted in an online money transfer according to the seventh exemplary embodiment of the method according to the invention.

With reference to FIG. 21 through 23, the second exemplary embodiment of the system according to the invention and the seventh exemplary embodiment of the method according to the invention are illustrated:

The exemplary embodiment relates to an online banking method and the devices used therein. It is however, pointed out that the method and devices can be used whenever data are to be securely transmitted electronically from one data processing unit to another data processing device. It is remarked that the second exemplary embodiment of the system according to the invention and the seventh exemplary embodiment of the method according to the invention can complement the previous exemplary embodiments by making the data transmission even more secure. However, it is also possible to operate these exemplary embodiments of the system and method according to the invention completely independently from the previous exemplary embodiments. Thus, they constitute independent aspects of the present invention.

The data processing system for performing the online money transfer is schematically shown in FIG. 21. It comprises a first data processing unit 2 of a user, e.g. a bank customer, and as second data processing unit a bank server 1.

The data processing unit 2 of the user comprises a central computing unit 13, to which a data-index-device 14, an input device 15, an output device 16 and an index-transaction-code-device 17 are connected. Into the input device 15, at least the data to be transmitted can be entered. With the data-index-device 14, an index can be determined from the data to be transmitted as will be illustrated later. With the index-transaction-code-device 17, a transaction code can be obtained from a specific index as will also be illustrated later. With the central computing unit 13, the data to be transmitted can be linked with a transaction code obtained by the index-transaction-code-device 17. The data linked to the transaction code can then by transmitted to other data processing devices using the output device 16.

The bank server 1 comprises a central processing unit 18 to which a receiving device 20, a further data-index-device 19 and a further index-transaction-code-device 21 are connected. With the receiving device 20 data can be received from the user's data processing device 2. However, the units 16 and 20 can, by the way, also be adapted to both receive and send data. Via the units 16 and 20 the user's data processing device 1 and the bank server 1 can establish an online connection via an electronic network like e.g. the Internet 22, or via other means for data transmission. Thus, data can be exchanged between the user's data processing device 2 and the bank server 1. The data-index-device 19 and the index-transaction-code-device 21 of the bank server 1 correspond, with respect to their function, to the respective devices 14 and 17 of the user's data processing device 2.

In the following, the online banking method according to the seventh exemplary embodiment of the method according to the invention and the embodiments of the respective devices of the data processing system are illustrated:

Initially—as means for obtaining a plurality of transaction codes from a plurality of indices—a plurality of user—specific transaction-codes, particularly transaction numbers (TAN) are transmitted to a user in a manner known in principle. There, exactly one index is assigned to each transaction number. Thus there is a bijective mapping between the set of transaction numbers and the set of indices. Each transaction number is only valid for one data transmission. A table 26 with transaction numbers and assigned indexes is shown in FIG. 22. Such a table could be transmitted in advance in an arbitrary manner to the users for online money transfers or other transactions with the bank. Instead of the table, the user could also be provided with a device or algorithm that generates corresponding tables; in this case, the specification as to how the table 26 for a specific user is generated must be known at the bank so that the corresponding tables 26 are also known at the bank. The transmission of table 26 corresponds, in the known online banking method, to the transmission of indexed transaction numbers.

The user now wants to securely transmit data electronically to a bank server 1. For example, he wants to perform an online money transfer to a specific beneficiary. For this purpose, an online connection is established between the data processing unit 2 and the bank server 1 over the Internet 22. The data processing unit 2 is then provided, by the bank server 1, with a form 23 as shown in FIG. 23. Into this form, the user can enter data for the online money transfer using the input device 15 of his data processing device 2. The form contains fields for specifying a beneficiary, like the beneficiary's name, the bank code number of the beneficiary's bank, and the beneficiary's account number. Further, the amount to be transferred can be entered. Finally, the form contains a field for entering the transaction number that the user, or respectively his data processing unit 2, can select from the list of table 26.

When selecting the transaction number, the following method is applied in the exemplary embodiment described:

The index of the transaction number to which the money transfer data are supposed to be linked, has a correlation with the data to be transmitted, i.e. with the online money transfer data in this case. This means that a modification of the part of the transmitted data that is incorporated into the correlation with the index leads to a different index.

In the exemplary embodiment described here, the index 25 of the transaction number that is supposed to be linked to the data to be transmitted, i.e. the online money transfer data, corresponds to the last two digits of the beneficiary's account number 24. In the example shown in FIG. 22. and 23, these are the last two digits "21". The index 25 can easily be determined by the user on the basis of his money transfer data. However, it is also possible that the data-index-device 14 of the user's data processing device 2 automatically determines this index 25 from the money transfer data to be transmitted. Such an automated determining is particularly useful when the specification by which the index 25 is determined is more complicated than in the exemplary embodiment described there and when multiple data are incorporated into determining the index 25.

The transaction number with the index "21" is "85821745". The user can easily read this with the aid of his table that has been previously transmitted to him, and then enter this transaction number via the input device 15. However, the table could also be stored in the user's data processing device 2. In this case, the index-transaction-device 17 could automatically obtain the transaction number "85821745". The correlation between the transaction number and the index assigned to it could also be more complicated, however. For example, in the index-transaction-code device 17 there could be stored an algorithm that generates, using an index as the input value, a transaction code as the output value.

This transaction number "85821745" is being linked to the online money transfer data. This is effected by the central computing unit 13 of the user's data processing device 2. As soon as the link between the transaction number and the online money transfer data is established, the online money transfer data can be transmitted over the Internet 22 to the bank server 1 in a manner known in principle.

According to another embodiment the form 23 is generated by a program executed on the user's data processing device 2. The online money transfer data linked to the obtained transaction number can then be transmitted to the bank server 1 in a manner known in principle.

When establishing the online connection between the user's data processing device 2 and the bank server the user authenticates himself so that the bank server 1 knows by which user the money transfer data are supposed to come. Alternatively, this information can also be transmitted together with the online money transfer data.

In order to verify that the transmission of the online money transfer data has not been manipulated, the central computing unit 18 of the bank server 1 checks whether the transaction number linked to the online money transfer data belongs to the set of valid transaction numbers and, in case the check is positive, determines the index assigned to this transaction number. In the exemplary embodiment shown, the index "21" is assigned to the transaction number "85821745". This step is executed in the index-transaction-code-device 21. Subsequently, the data-index-device 19 of the bank server 1 determines whether this index has the specified correlation with the money transfer data. Here, the data-index-device 19 uses the same method that was used when the index of the transaction number (that was being linked to the online money transfer data) was determined. Thus, in the present case, the central computing unit 18 of the bank server 1 determines whether the index corresponds to the last two digits of the beneficiary's account number. If the money transfer data have not been manipulated during transmission, the account number is still "58204821", i.e. the last two digits of this account number correspond to the index of the transaction number "85821745".

Alternatively, the verification can also be performed by determining, from the transmitted data, via the specified correlation, the index belonging to these data, and verifying whether the index determined in this way is a valid index and, in a second step, verifying whether the transaction code assigned to this index is identical to the transmitted transaction code.

Any manipulation of the last two digits of the account number, particularly during the data transmission, can thus easily be detected at the bank. Furthermore, arbitrary further security-critical data can be secured in this way.

If, for example through a "man-in-the-middle-attack", the beneficiary's account number has been modified so that the last two digits are e.g. "03", the data-index-device 19 and the index-transaction-code-device 21 of the bank server 1 would, from this account number, via the index "03", determine the transaction number "43883978", as can be seen from table 26 of FIG. 22. This transaction number does not match the transaction number that was linked to the money transfer data, so that the central computing unit 18 of the bank server 1 can easily detect the manipulation of the beneficiary data.

It is pointed out that the previously described specification by which, from the data to be transmitted, the index of the transaction number (with which transaction number the data to transmitted are being linked) was determined is a very simple specification. However, much more complex functional correlations or algorithms could be employed here which can particularly include all data that shall be protected from a manipulation. Particularly, this could be all digits of the beneficiary's account number, and the algorithm could be a conventional check digit algorithm as used to check the correct format of an account number as a protection against typing errors or transposed digits. Further, also all digits of the beneficiary's bank code number and the beneficiary's name could be included. Further, the amount should be protected from a manipulation and thus be taken into account when determining the index 15. Here, determining the index 15 can be performed by the user himself or in a fully automated manner by the user's data processing device 1. Likewise, the verification of the received data at the bank can be performed in a fully automated manner.

Preferably, however, a specification is employed that, on one hand, is relatively secure against manipulations of the underlying data, but on the other hand can easily be reproduced by a user. E.g. for each user, individually different digits from an account number could be used as index. For user A, e.g. the $3^{rd}$ and $5^{th}$ digit of an entered account number could constitute the index, for user B the $2^{nd}$ and $6^{th}$ digit. Thus—contrary to the above-described method in which the last two digits of an account number have been used—even those manipulation attempts would be precluded in which a fraudster could try to obtain e.g. hundred different account numbers having last digits 00 trough 99 in order to fully cover the last-digit range between 00 and 99, in order to divert, in a "man-in-the-middle attack", an account number entered by the user, ending e.g. with "17" to the one of his hundred account numbers that also ends with "17".

According to a further form of this exemplary embodiment a conventional online money transfer method with indexed transaction numbers is being combined with the method according to the invention. Here, before the data transmission, the bank server 1 transmits to the user's data processing device 2 a code which is taken into account when determining the index 25. For example, both this initially transmitted code and the beneficiary's data and the amount are used as parameters in determining the index 25.

If the method according to the seventh exemplary embodiment is being combined with one of the methods of the first six exemplary embodiments, both the transparency 11 with the decryption pattern and the transaction codes with the assigned indices are initially transmitted to the user. The transaction code to be transmitted in order to confirm e.g. a bank transaction is then obtained as described in the seventh exemplary embodiment of the method according to the invention. In this case, however, the input is not effected in plain text, but via the encrypted input instructions, particularly the input mask as described in the first six exemplary embodiments.

Having described the invention, the following is claimed:

1. A method for transmitting data from a first data processing device to a second data processing device, the first data processing device comprising a display device, wherein
   a) the second data processing device generates encrypted input instructions and transmits them to the first data processing device;
   b) the first data processing device displays the encrypted input instructions;
   c) the encrypted input instructions are decrypted by being viewed through an optical filter having a decryption pattern, wherein the decryption pattern comprises:
      i. areas which are designed in a way that the optical filter masks out said areas, and
      ii. a plurality of use areas embedded therein, said use areas being designed in a way that symbols for input instructions can be displayed, the size and shape of each use area constituting a secret of said decryption pattern,
         wherein the decryption pattern, in said use areas, contains a binary image pattern, the binary coding of which constitutes a secret of the decryption pattern;
   d) the second processing device generates the encrypted input instructions in a way that
      i. for said areas of the decryption pattern which are designed in a way that the optical filter masks out said areas, a binary image pattern with binary-coded, random noise is generated, wherein for each input instruction, the random noise is newly generated for those areas that are not used for decryption,
      ii. and for said use areas in which the decryption pattern contains a binary image pattern, a binary image pattern complementary or identical to the decryption pattern is generated, and
      iii. at those pixels of said complementary or identical image pattern that shall represent the input instructions, the pixel state is reversed so that they match the corresponding pixels of the decryption pattern or are complementary thereto; and e) the data to be transmitted are input into the first data processing device using the input instructions that have been decrypted by the optical filter and are transmitted to the second data processing device.

2. A method according to claim 1, wherein the input instructions are an input mask and wherein the data to be transmitted are input into the first data processing device via the input mask decrypted by the optical filter.

3. A method according to claim 1, wherein the input instructions include a code and wherein the code is entered, upon decryption effected by the optical filter, into the first data processing device and transmitted to the second data processing device.

4. A method according to claim 1, wherein
for transmitting data to the second data processing device, means for obtaining a plurality of transaction codes from a plurality of indices are transmitted to a user or to the first data processing device and
the electronic transmission from the first data processing device to the second data processing device is linked with one of the plurality of transaction codes, the index of this one transaction code having a correlation with the transmitted data.

5. A method according to claim 4, in which the first data processing device corresponds to a data processing device of a user and the second data processing device corresponds to a bank server.

6. A method according to claim 5, wherein the index of the one transaction code derives from digits of an account number of the beneficiary and/or from digits of the amount of a money transfer to the beneficiary.

* * * * *